US008586704B2

(12) United States Patent
Elmore et al.

(10) Patent No.: US 8,586,704 B2
(45) Date of Patent: *Nov. 19, 2013

(54) EPOXY SYSTEMS AND AMINE POLYMER SYSTEMS AND METHODS FOR MAKING THE SAME

(75) Inventors: Jim D. Elmore, Houston, TX (US); Larry Steven Corley, Houston, TX (US); Jerry R. Hite, Sugar Land, TX (US)

(73) Assignee: Momentive Specialty Chemicals Inc., Columbus, OH (US)

(*) Notice: Subject to any disclaimer, the term of this patent is extended or adjusted under 35 U.S.C. 154(b) by 290 days.

This patent is subject to a terminal disclaimer.

(21) Appl. No.: 12/966,616

(22) Filed: Dec. 13, 2010

(65) Prior Publication Data

US 2012/0149804 A1 Jun. 14, 2012

(51) Int. Cl.
*C08G 69/40* (2006.01)
*C08G 69/48* (2006.01)
*C08K 5/04* (2006.01)
*C08L 63/00* (2006.01)
*C08L 63/02* (2006.01)

(52) U.S. Cl.
USPC ............... 528/414; 525/423; 528/339

(58) Field of Classification Search
None
See application file for complete search history.

(56) References Cited

U.S. PATENT DOCUMENTS

| 3,477,990 | A | 11/1969 | Dante et al. |
|---|---|---|---|
| 4,315,044 | A | 2/1982 | Elmore et al. |
| 4,734,468 | A | 3/1988 | Marx |
| 5,602,193 | A | 2/1997 | Stark |
| 5,741,835 | A | 4/1998 | Stark |
| 6,127,459 | A | 10/2000 | Stark et al. |
| 6,136,894 | A | 10/2000 | Stark et al. |
| 6,143,809 | A | 11/2000 | Elmore et al. |
| 6,221,934 | B1 | 4/2001 | Stark et al. |
| 6,235,931 | B1 | 5/2001 | Wang et al. |
| 6,277,928 | B1 | 8/2001 | Stark et al. |
| 6,359,037 | B1 | 3/2002 | Stark et al. |
| 6,653,436 | B2 | 11/2003 | Back et al. |
| 6,956,086 | B2 | 10/2005 | Back et al. |
| 7,666,954 | B2 | 2/2010 | Walker et al. |
| 2004/0063901 | A1 | 4/2004 | Back et al. |

*Primary Examiner* — Robert Sellers

(57) ABSTRACT

Compositions and methods for forming surfactants, aqueous dispersions, and curing agents are provided. In one aspect, the invention relates to improved epoxy functional surfactants prepared by reaction of an epoxy composition and an amidoamine composition formed from a blend of acid-terminated polyoxyalkylene polyols. The improved epoxy functional surfactants may be reacted with an excess of epoxy composition and water to result in an aqueous dispersion. The amidoamone composition may be a reaction mixture of a diamine compound and an acid terminated polyoxyalkylene composition formed from two or more polyoxyalkylene polyol compounds. The epoxy functional surfactant may be reacted with amine compounds to form a compound suitable as a curing agent.

26 Claims, 1 Drawing Sheet

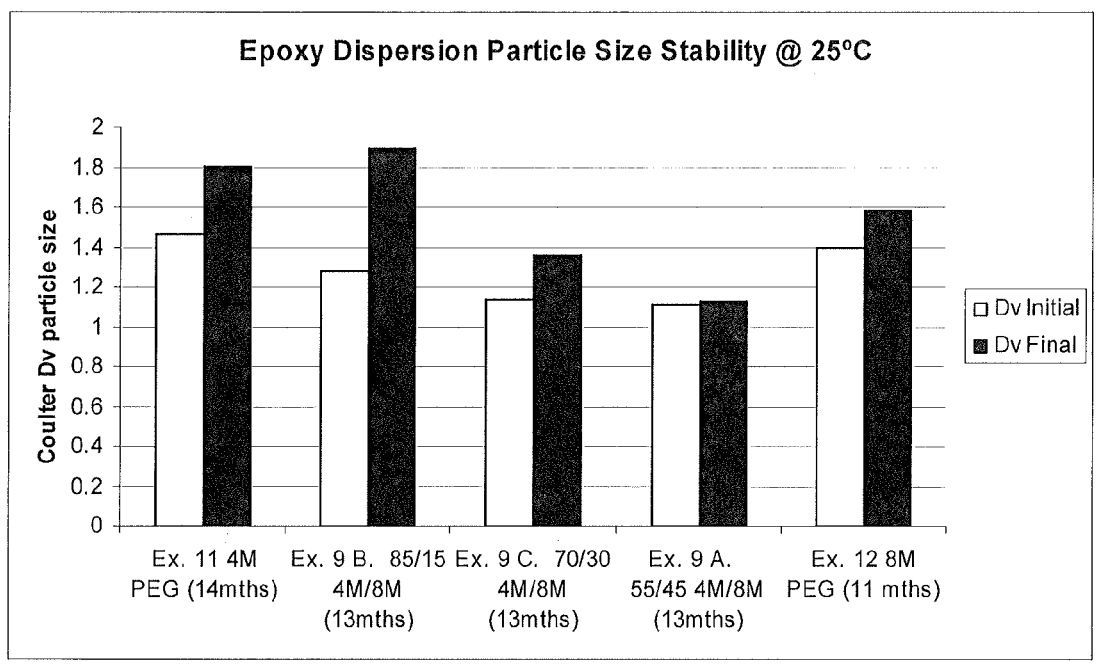

EPOXY SYSTEMS AND AMINE POLYMER SYSTEMS AND METHODS FOR MAKING THE SAME

FIELD OF THE INVENTION

The invention relates to surfactants and aqueous dispersions of epoxy resins. In one aspect, the invention relates to improved amine functional surfactants and to improved epoxy functional surfactants prepared by reaction of an epoxy composition and an amine composition formed from a blend of polyoxyalkylene polyols.

BACKGROUND OF THE INVENTION

Aqueous dispersions of epoxy resins have been known for many years. However, the performance of these dispersions as elements of coatings has been viewed as inferior to their solvent borne counterparts. It is known that the surfactants employed to render the epoxy component emulsifiable such as nonylphenol ethoxylates, alkylphenol initiated poly(oxyethylene) ethanols, alkylphenol initiated poly(oxypropylene) poly(oxyethylene) ethanols, and block copolymers containing an internal poly(oxypropylene) block and two external poly(oxyethylene) ethanol blocks readily migrate to surface interfaces where, it is speculated, they deleteriously affect film performance.

Moreover, as aqueous dispersions of epoxy resins have become more widely used in industry, improved handling properties such as storage stability are required. The storage stability of many water borne epoxy dispersions degrades over time due to the presence of amine nitrogen atoms in the surfactant molecules. As the pH of water borne dispersions increases over 9.8, the storage stability can no longer be measured in years, but rather is measured in months.

It would also be desirable to decrease the particle size of the solids, or decrease the amount of surfactant required at a given solids level, or to disperse solids at a given particle size using less surfactant. Often, a larger amount of surfactant needed to decrease the particle size and effectively disperse the solids in water leads to increased pH and reduced storage stability. Decreasing the surfactant level to control the pH causes an increase in particle size.

Therefore, there is a need to form improved surfactants for forming aqueous dispersions of epoxy resins.

SUMMARY OF THE INVENTION

Embodiments of the invention are directed to surfactants for use in aqueous dispersions of epoxy resins and for use in amine polymer compositions. The surfactants may be further modified functionally for use as curing agents in epoxy compositions. In one aspect, the invention relates to improved epoxy functional surfactants prepared by reaction of an epoxy composition and an amidoamine composition formed from a blend of acid-terminated polyoxyalkylene polyols.

In one aspect of the invention an amidoamine composition is provided, including a reactant product of an acid terminated polyoxyalkylene composition of two or more acid terminated polyoxyalkylene polyol compounds, wherein the acid terminated polyoxyalkylene composition has a polydispersity of 1.1 or greater and the two or more acid terminated polyoxyalkylene polyol compounds have from about 50% to about 100% of carboxylic end groups oxidized from hydroxyl end groups and a diamine compound comprising a first amine substituent group of a primary amine substituent group and a second amine substituent group of a primary amine substituent group or a secondary amine substituent group, wherein the reaction product comprises an amidoamine compound having the formula of:

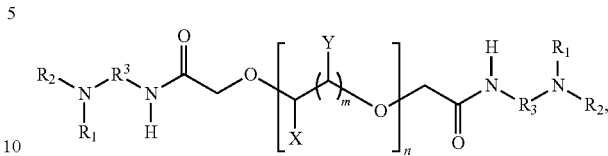

wherein each of $R_1$ and $R_2$ comprises a hydrogen atom or a substituent group selected from the group of a branched or linear aliphatic, a cycloaliphatic, an aromatic substituent group and combinations and subsets thereof, having 1 to 21 carbon atoms, with at least one of $R_1$ and $R_2$ comprising a hydrogen atom, $R_3$ is a divalent hydrocarbon substituent group selected from the group of a branched or linear aliphatic, a cycloaliphatic, an aromatic substituent group, and combinations and subsets thereof, having 2 to 18 carbon atoms, n is an average number from about 18 to about 500, X is a hydrogen atom or a substituent group selected from the group consisting of a methyl substituent, an ethyl substituent, a hydroxymethyl substituent group, and combinations thereof, and Y is a hydrogen atom or a substituent group selected from the group of a methyl substituent, an ethyl substituent, a hydroxymethyl substituent group, and combinations thereof.

In another aspect of the invention, a method for forming an amidoamine composition is provided including providing an acid terminated polyoxyalkylene composition of two or more acid terminated polyoxyalkylene polyol compounds, wherein the acid terminated polyoxyalkylene composition has a polydispersity of 1.1 or greater and the two or more acid terminated polyoxyalkylene polyol compounds have from about 50% to about 100% of carboxylic end groups oxidized from hydroxyl end groups, providing a diamine compound comprising a first amine substituent group of a primary amine substituent group and a second amine substituent group of a primary amine substituent group or a secondary amine substituent group, and reacting the acid terminated polyoxyalkylene composition and the first diamine compound to form a reaction product, wherein the reaction product comprises an amidoamine compound having the formula of:

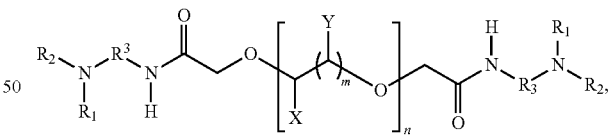

wherein each of $R_1$ and $R_2$ comprises a hydrogen atom or a substituent group selected from the group of a branched or linear aliphatic, a cycloaliphatic, an aromatic substituent group and combinations and subsets thereof, having 1 to 21 carbon atoms, with at least one of $R_1$ and $R_2$ comprising a hydrogen atom, $R_3$ is a divalent hydrocarbon substituent group selected from the group of a branched or linear aliphatic, a cycloaliphatic, an aromatic substituent group, and combinations and subsets thereof, having 2 to 18 carbon atoms, n is an average number from about 18 to about 500, X is a hydrogen atom or a substituent group selected from the group consisting of a methyl substituent, an ethyl substituent, a hydroxymethyl substituent group, and combinations thereof, and Y is a hydrogen atom or a substituent group selected from the group of a methyl substituent, an ethyl substituent, a hydroxymethyl substituent group, and combinations thereof.

In another aspect of the invention, an epoxy composition is provided including a reaction product prepared by reacting an epoxy component and an amidoamine composition, wherein the reaction product comprises an epoxy-functional surfactant having the structure:

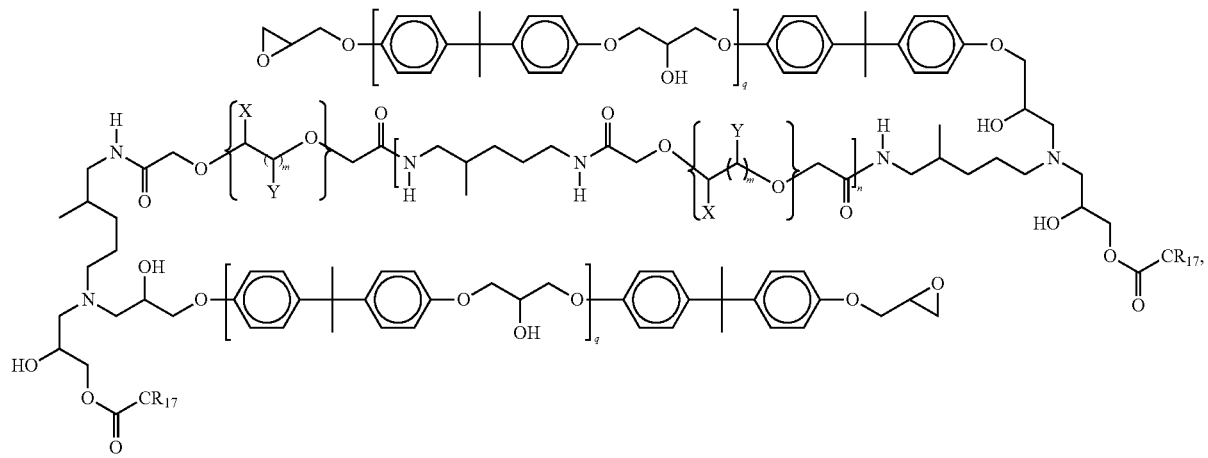

and m is from 1 to 11, n is from 1 to 3, q is from 0 to 8, p is from about 18 to about 500, X is a hydrogen atom, a methyl substituent, an ethyl substituent, a hydroxymethyl substituent group, subsets thereof, or combinations thereof, and each Y is a hydrogen atom, a methyl substituent, an ethyl substituent, a hydroxymethyl substituent group, subsets thereof, or combinations thereof, and $R_{17}$ may be an alkyl group, an aryl group, an acyl group, and subsets and combinations thereof.

BRIEF DESCRIPTION OF THE DRAWING

The advantages and further aspects of the disclosure will be readily appreciated by those of ordinary skill in the art as the same becomes better understood by reference to the following detailed description when considered in conjunction with the accompanying drawings in which like reference characters designate like or similar elements throughout the several figures of the drawing and wherein:

FIG. 1 is a graph illustrating epoxy dispersion particle size stability at 25° C. for epoxy dispersions as formed with the material and process described herein as compared to the prior art epoxy dispersions.

DETAILED DESCRIPTION OF THE INVENTION

Embodiments of the invention are directed to surfactants for use in aqueous dispersions of epoxy resins and for use in amine polymer compositions. The surfactants may be further modified functionally for use as curing agents in epoxy compositions. In one aspect, the invention relates to improved epoxy functional surfactants prepared by reaction of an epoxy composition and an amidoamine composition formed from a blend of acid-terminated polyoxyalkylene polyols.

Some embodiments of the invention are directed to forming surfactants from blends of two or more acid terminated polyoxyalkylene polyol-containing compounds (also known as oxidized polyoxyalkylene polyols and carboxylated polyoxyalkylenes) having different molecular weights. One surfactant may be a polyamidoamine functionalized polyoxyalkylene prosurfactant made from the acid terminated polyoxyalkylene polyol-containing compounds blend. The polyamidoamine functionalized polyoxyalkylene surfactants may then be further reacted to form epoxy functional surfactants, which may be formed separate or in situ with an epoxy resin. The epoxy functional surfactants may be used to form aqueous epoxy dispersions. The epoxy functional surfactants may also be further reacted to form amine terminated surfactants, which amine-terminated surfactants may be used for aqueous amine polymer dispersions or as curing agents for epoxy compositions. Thermoset coatings and fiber size formulations may be made from the dispersions described herein.

It was surprisingly and unexpectedly discovered that blends of partially oxidized polyoxyalkylene polyols of dissimilar molecular weight provide unexpected superior reactive surfactants for emulsifying epoxy functional and amine functional polymers into "resin in water" dispersions. The superior properties observed included reduced particle size and improved shelf life with improved (higher) non-volatiles content and improved (lower) viscosity epoxy polymer dispersions.

In one aspect of the invention, an amidoamine composition of the prosurfactant described herein is formed from a reactant product of an acid terminated polyoxyalkylene polyol-containing composition of two or more acid terminated polyoxyalkylene polyol compounds having a combined polydispersity of 1.1 or greater, the polyoxyalkylene polyol compounds being oxidized from about 50% to about 100% conversion of hydroxyl to carboxyl group, and a diamine compound comprising a first amine substituent group of a primary amine substituent group and a second amine substituent group of a primary amine substituent group or a secondary amine substituent group.

Manufacture of an Amidoamine Compound and Composition

In one aspect, an amidoamine compound, such as a polyamidoamine functionalized polyoxyalkylene prosurfactant (also referred to herein as amidoamine prosurfactant) that is formed by the processes described herein may have the formula of:

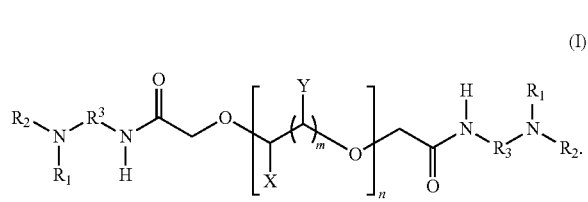

(I)

$R_1$ is a hydrogen atom or a substituent group selected from the group of a branched or linear aliphatic, a cycloaliphatic, an aromatic substituent, and combinations and subsets thereof, having 1 to 21 carbon atoms. $R_2$ is a hydrogen atom or a substituent group selected from the group of a branched or linear aliphatic, a cycloaliphatic, an aromatic substituent, and combinations and subsets thereof, having 1 to 21 carbon atoms, with at least one of $R_1$ and $R_2$ comprising a hydrogen atom. $R_3$ is a divalent hydrocarbon substituent group selected from the group of a branched or linear aliphatic, a cycloaliphatic, an aromatic substituent group, and combinations and subsets thereof, having 2 to 18 carbon atoms, m may be 1, 2, or 3, and n may be an average number from about 18 to about 500. For the repeating units x may be a hydrogen atom or a substituent group selected from the group of a methyl substituent, an ethyl substituent, a hydroxymethyl substituent group, and combinations thereof. Y may be a hydrogen atom or a substituent group selected from the group of a methyl substituent, an ethyl substituent, a hydroxymethyl substituent group, and combinations thereof. The oxyalkylenes may be random or block polymerized.

The polyamidoamine functionalized polyoxyalkylene prosurfactant of Formula (I) may have an amine value from about 8 to about 30, such as from about 12 to about 24, for example, from about 14 to about 18. The polyamidoamine functionalized polyoxyalkylene prosurfactant may be hydrophilic.

The polyamidoamine functionalized polyoxyalkylene prosurfactant of Formula (I) may have a weight average molecular weight ($M_w$) from about 200 to about 22,000, such as from about 2,000 to about 12,000, for example, about 4,000 to about 10,000. The number average molecular weight ($M_n$) may be from about 180 to about 20,000, such as from about 1,800 to about 11,000, for example, about 3,000 to about 8,000. The number average (nominal) molecular weight represents the total weight of the polymer divided by the total number of molecules in the total weight.

Additionally, the molecular weight distribution may be further addressed with regard to a Z-average molecular weight ($M_Z$) and a Z+1 average molecular weight ($M_{Z+1}$) as commonly understood to one skilled in the art with regard to molecular weight distribution analysis. The Z-average molecular weight ($M_Z$) may be from about 300 to about 30,000, such as from about 3,000 to about 20,000, for example, about 5,000 to about 14,000. The Z+1 average molecular weight ($M_{Z+1}$) may be from about 400 to about 40,000, such as from about 4,000 to about 27,000, for example, from about 6,500 to about 19,000.

In one aspect, the polyamidoamine functionalized polyoxyalkylene prosurfactant may be formed from two or more acid terminated polyoxyalkylene polyol-containing compounds (also known as oxidized polyoxyalkylene polyol and carboxylated polyoxyalkylenes) having different molecular weights that are reacted with at least one diamine as described herein.

The at least one diamine compound may include a first amine substituent group of a primary amine substituent group and a second amine substituent group of a primary amine substituent group or a secondary amine substituent group. The reaction may occur with or without an excess of diamine, including an amine to acid equivalent ratio from about 12:1 to about 2:3.

Alternatively, the polyamidoamine functionalized polyoxyalkylene prosurfactant may be formed from an acid terminated polyoxyalkylene polyol-containing compound reacted with at least one diamine. The compound of at least one diamine may include a first amine substituent group of a primary amine substituent group and a second amine substituent group of a secondary amine substituent group. The reaction may occur with an excess of diamine, including an amine to acid equivalent ratio from about 3:1 to about 1:2.

In one embodiment of the prosurfactant, the polyamidoamine functionalized polyoxyalkylene prosurfactant may be formed from a blend of two or more acid terminated polyoxyalkylene polyol-containing compounds having different molecular weights as described herein that are reacted with the at least one diamine. For example, a blend of a first acid terminated polyoxyalkylene polyol-containing compound and a second acid terminated polyoxyalkylene polyol-containing compound having a molecular weight higher than the molecular weight of the first acid terminated polyoxyalkylene polyol-containing compound, which compounds are reacted with the at least one diamine. The reaction may occur with an amine to acid equivalent ratio from about 12:1 to about 1:2.

In another aspect, the polyamidoamine functionalized polyoxyalkylene prosurfactant may be formed by separately forming amidoamines from two or more acid terminated polyoxyalkylene polyol-containing compounds and then combining the products of the reactions into a blend of polyamidoamine functionalized polyoxyalkylene prosurfactant. Each reaction may be with at least one diamine as described herein and each reaction may have the same or different diamine. Each of the reactions may be performed with the processes described herein and may occur with an amine to acid equivalent ratio of from about 12:1 to about 1:2.

One embodiment of the prosurfactant composition involves forming an amidoamine mixture from a blend of two acid terminated polyoxyalkylene polyol-containing compounds together in a blend ratio from about 3:17 to about 17:3, such as a blend ratio of about 11:9, of a first molecular weight acid terminated polyoxyalkylene polyol with a second molecular weight acid terminated polyoxyalkylene polyol. Alternatively, the blend may be from about 15 wt. % to about 85 wt. %, for example, about 45%, of a first molecular weight acid terminated polyoxyalkylene polyol and from about 85 wt. % to about 15 wt. %, for example, about 55%, of a second molecular weight acid terminated polyoxyalkylene polyol. The second acid terminated polyoxyalkylene polyol-containing compound has a molecular weight higher than the molecular weight of the first acid terminated polyoxyalkylene polyol-containing compound. The first molecular weight acid terminated polyoxyalkylene polyol may have a weight average molecular weight from about 200 to about 5,000, such as from about 2,000 to about 5,000 as described below, and the second molecular weight acid terminated polyoxyalkylene polyol may have a weight average molecular weight from greater than 4,000 to about 16,000 as described below.

The acid terminated polyoxyalkylene polyol-containing compounds may have the formula:

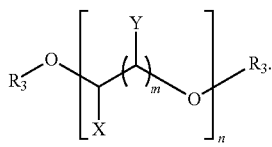

(IIa)

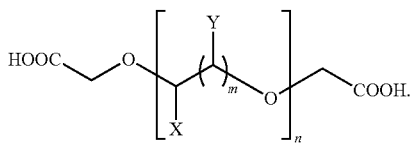

(IIb)

$R_3$ may be a hydrogen atom or a divalent hydrocarbon substituent group selected from the group of a branched or linear aliphatic, a cycloaliphatic, an aromatic substituent group, and combinations and subsets thereof, having 2 to 18 carbon atoms, and the hydrocarbon substituent group has a hydroxyl-terminus group or a carboxyl-terminus group. For the repeating units, in may be from 1-11 and n may be an average number from about 18 to about 500 for each of the respective acid terminated polyoxyalkylene polyol-containing compounds. X may be a hydrogen atom, a methyl substituent, an ethyl substituent, or a hydroxymethyl substituent group. Y may be a hydrogen atom, a methyl substituent, an ethyl substituent, or a hydroxymethyl substituent group. The acid-terminated polyoxyalkylene polyol-containing compounds may be random or block polymers. The polyoxyalkylene polyol-containing compounds may have from about 50% to 100%, such as from about 70% to about 95%, of the hydroxyl end groups oxidized to form the acid terminated substituent groups (carboxylic acid end groups/carboxyl end groups).

The weight average molecular weight ($M_w$) of the acid terminated polyoxyalkylene polyol-containing compound of Formula (IIa) may be from about 200 to about 22,000, such as from about 2,000 to about 10,000, for example, about 4,000 to about 10,000. The number average molecular weight ($M_n$) may be from about 180 to about 20,000, such as from about 1,800 to about 11,000, for example, about 3,000 to about 8,000. The number average (nominal) molecular weight represents the total weight of the polymer divided by the total numbers of moles of molecules which the polymer contains.

Additionally, the molecular weight distribution may be further addressed with regard to a Z-average molecular weight ($M_Z$) and a Z+1 average molecular weight ($M_{Z+1}$) as commonly understood to one skilled in the art with regard to molecular weight distribution analysis. The Z-average molecular weight ($M_Z$) may be from about 300 to about 30,000, such as from about 3,000 to about 20,000, for example, about 5,000 to about 14,000. The Z+1 average molecular weight ($M_{Z+1}$) may be from about 400 to about 40,000, such as from about 4,000 to about 27,000, for example, from about 6,500 to about 19,000.

For a combined composition of two or more acid terminated polyoxyalkylene polyol-containing compound, the composition may have a polydispersity of greater than about 1.1. In one aspect, such a composition may have a polydispersity from about 1.15 to about 5, such as from about 1.22 to about 1.70. The polydispersity is calculated by the division of the weight average molecular weight ($M_W$) by the number average molecular weight ($M_N$).

Examples of suitable acid terminated polyoxyalkylene polyol-containing compounds include acid terminated polyoxyethylene glycols, acid terminated polypropylene glycols, and combinations thereof. For example, each of the two or more acid terminated polyoxyethylene glycol-containing compounds may have the formula:

N may be an average number from about 18 to about 500 for each of the respective polyoxyalkylene glycol compounds. For the repeating units, in may be from 1-11 and n may be an average number from about 18 to about 500 for each of the respective acid terminated polyoxyethylene glycol-containing compounds. X may be a hydrogen atom, a methyl substituent, an ethyl substituent, or a hydroxymethyl substituent group. Y may be a hydrogen atom, a methyl substituent, an ethyl substituent, or a hydroxymethyl substituent group. The acid terminated polyoxyethylene glycol-containing compounds may be random or block polymers. The polyoxyethylene glycol-containing compounds may have from about 50% to 100%, such as from about 70% to about 95%, of the hydroxyl end groups oxidized to form the carboxylic acid end groups.

The weight average molecular weight of the acid terminated polyoxyethylene glycol-containing compound of Formula (IIb) may be from about 200 to about 22,000, such as from about 2,000 to about 10,000, for example, about 4,000 to about 10,000. The number average molecular weight ($M_n$) may be from about 180 to about 20,000, such as from about 1,800 to about 11,000, for example, about 3,000 to about 8,000. The number average (nominal) molecular weight represents the total weight of the polymer divided by the total numbers of moles of molecules which the polymer contains.

Additionally, the molecular weight distribution may be further addressed with regard to a Z-average molecular weight ($M_Z$) and a Z+1 average molecular weight ($M_{Z+1}$) as commonly understood to one skilled in the art with regard to molecular weight distribution analysis. The Z-average molecular weight ($M_Z$) may be from about 300 to about 30,000, such as from about 3,000 to about 20,000, for example, about 5,000 to about 14,000. The Z+1 average molecular weight ($M_{Z+1}$) may be from about 400 to about 40,000, such as from about 4,000 to about 27,000, for example, from about 6,500 to about 19,000.

In one embodiment, a composition of the acid terminated polyoxyalkylene glycol-containing compounds may be formed by oxidizing a mixture of two or more polyoxyalkylene polyol compounds, such as two or more polyoxyalkylene glycol compounds. Alternatively, a composition of the acid terminated polyoxyalkylene glycol-containing compounds may be formed by independently oxidizing each of two or more polyoxyalkylene polyol compounds, such as two or more polyoxyalkylene glycol compounds, and then combining the respective acid terminated polyoxyalkylene polyol-containing compounds into one composition.

Either oxidized separately and then combined or oxidized in combination, the blend ratio of two polyoxyalkylene polyol compounds may be from about 3:17 to about 17:3, such as a blend ratio from about 4:1 to about 1:4, for example about 11:9, of a first molecular weight polyoxyalkylene polyol to a second molecular weight polyoxyalkylene polyol. Alternatively, the blend ratio may be represented by a weight percent from about 15 wt. % to about 85 wt. %, for example, about 45%, of a first molecular weight polyoxyalkylene polyol and from about 85 wt. % to about 15 wt. %, for example, about 55%, of a second molecular weight polyoxyalkylene polyol. The second polyoxyalkylene polyol has a molecular weight higher than the molecular weight of the first polyoxyalkylene polyol.

Polyoxyalkylene polyol compounds may be oxidized or carboxylated/acidified to form acid terminated polyoxyalkylene polyol-containing compounds by oxidation of the polyoxyalkylene polyols including, but not limited to, the processes described in U.S. Pat. No. 6,235,931, which is incorporated herein by reference to the extent not inconsistent with the claimed aspects and description herein.

In an embodiment of one formation process, oxygen-containing gas is added to the polyoxyalkylene polyol in the presence of a free radical (e.g., 2,2,6,6-tetramethyl-1-piperidinyloxy) and an inorganic acid (e.g., nitric acid) in water to oxidize the hydroxyl groups to carboxylic acid groups. If diacid-terminated polyalkylene polyol is desired, substantially all of the alcohol groups are oxidized to carboxylic acid groups. The acid-terminated polyalkylene polyol-containing compounds may also be made by Williamson ether synthesis where a polyoxyalkylene polyol is reacted with chloroacetic acid and/or esters in the presence of a base.

In one embodiment of the reaction conditions, the temperature may be from about 20° C. to about 70° C., and at pressures in the range of from about atmospheric pressure up to about 100 psig. Following the reaction, the remaining inorganic acid and water is distilled from the reactor.

In one embodiment, the composition of two acid terminated polyoxyalkylene polyol-containing compounds may be formed by oxidizing a mixture of first molecular weight and second molecular weight polyoxyalkylene polyol compounds, such as polyoxyethylene glycols, having different molecular weights at a blend ratio from about 3:17 to about 17:3, such as a blend ratio of about 11:9, of a first molecular weight polyoxyalkylene polyol to a second molecular weight polyoxyalkylene polyol. The first molecular weight polyoxyalkylene polyol may have a molecular weight from 200 to about 5,000, and the second molecular weight polyoxyalkylene polyol may have a molecular weight from greater than 4,000 to about 16,000. The second molecular weight polyoxyalkylene polyol has a higher molecular weight than the first molecular weight polyoxyalkylene polyol.

The polyoxyalkylene polyols described herein include, and are not limited to, polyoxyalkylene polyols polymerized by alkali metal and double metal cyanide catalyst. The polyoxyalkylene polyols may be self-initiated with water, initiated with any glycol, including, and not limited to, liquid diols or glycerine, initiated with bisphenols, or initiated with other active hydrogen organic compounds including primary or secondary amines.

Examples of suitable polyalkylene polyol compounds may have the formula:

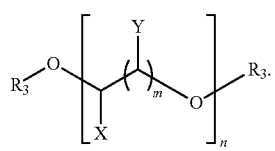

(IIIa)

$R_3$ may be a hydrogen atom or a divalent hydrocarbon substituent group selected from the group of a branched or linear aliphatic, a cycloaliphatic, an aromatic substituent group, and combinations and subsets thereof, having 2 to 18 carbon atoms, and each of the hydrocarbon substituent groups may have a hydroxyl-terminus group. For the repeating units, m may be from 1-11 and n may be an average number from about 18 to about 500 for each of the polyoxyalkylene polyol compounds. X may be a hydrogen atom, a methyl substituent, an ethyl substituent, a hydroxymethyl substituent group, a hydroxyl-terminus group, and subsets and combinations thereof. Y may be a hydrogen atom, a methyl substituent, an ethyl substituent, a hydroxymethyl substituent group, a hydroxyl-terminus group, and subsets and combinations thereof. Suitable polyoxyalkylene polyols include polyoxyethylene (polyether) glycols (PEG), polypropylene polyether glycols, 1,2 polybutylene polyether glycols, 1,4 polybutylene polyether glycols, and combinations thereof. Each of the polyoxyalkylene glycols may comprise a polyoxyethylene glycol monoalkylether or a monoalkylether of a block copolymer of ethylene oxide and propylene oxide or butylene oxide ("polyoxyalkylene glycol"), or a block copolymer of ethylene oxide and propylene oxide or polybutylene oxide ("polyoxyalkylene glycol").

Examples of suitable polyoxyethylene glycol (PEG) compounds may have the formula:

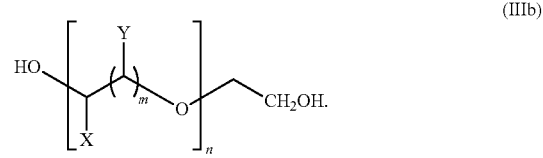

(IIIb)

For the repeating units, m may be from 1-11 and n may be an average number from about 18 to about 500 for example, about 230 for higher molecular weight compounds, and n may be from 5 to 150, for example, about 91, for lower molecular weight compounds. X may be a hydrogen atom, a methyl substituent, an ethyl substituent, a hydroxymethyl substituent group, a hydroxyl-terminus group, and subsets and combinations thereof. Y may be a hydrogen atom, a methyl substituent, an ethyl substituent, a hydroxymethyl substituent group, a hydroxyl-terminus group, and subsets and combinations thereof.

For the repeating units, m may be from 1 to 11 and n may be from 18 to 500, for example, about 230, for higher molecular weight compounds, and n may be from 5 to 150, for example, about 91, for lower molecular weight compounds.

Either individually or in combination, the number average molecular weight ($M_n$) of polyoxyalkylene glycol compounds may be from about 180 to about 20,000, such as from about 1,800 to about 11,000, for example, about 3,000 to about 8,000. The number average (nominal) molecular weight represents the total weight of the polymer divided by the total numbers of molecules the polymer contains. Either individually or in combination, the weight average molecular weight ($M_w$) of polyoxyalkylene glycol compounds may be from about 200 to about 22,000, such as from about 2,000 to about 10,000, for example, about 4,000 to about 10,000.

Additionally, the molecular weight distribution may be further addressed with regard to a Z-average molecular weight ($M_Z$) and a Z+1 average molecular weight ($M_{Z+1}$) as commonly understood to one skilled in the art with regard to molecular weight distribution analysis. The Z-average molecular weight ($M_Z$) may be from about 300 to about 30,000, such as from about 3,000 to about 20,000, for example, about 5,000 to about 14,000. The Z+1 average molecular weight ($M_{Z+1}$) may be from about 400 to about 40,000, such as from about 4,000 to about 27,000, for example, from about 6,500 to about 19,000.

For a combined composition of two or more polyoxyalkylene polyols, the composition may have a polydispersity of greater than about 1.1, such as from 1.15 to 1.70 or from 1.25 to about 1.55, for example, about 1.35 to about 1.45, which is calculated by the division of the weight average molecular weight ($M_w$) by the number average molecular weight ($M_n$).

In on example, the first molecular weight polyoxyalkylene polyol compound may have n in the range of 5 to 150, such as from 45 to 115, for example, about 91, providing for a first number average molecular weight from about 2,000 to about 5,000, such as about 4000 and a first weight average molecular weight from about 2,200 to about 5,500, such as about 4,400. The second molecular weight polyoxyalkylene polyol compound may have n in the range of about 18 to about 500, such as from about 90 to about 365, for example, about 230, providing for a second number average molecular weight from about 4,000 to about 18,000, such as from about 4,000 to about 16,000, for example, about 8000 and a second weight average molecular weight from about 4,400 to about 17,600, such as about 8,800. In one example, the respective first weight average molecular weight and second weight average molecular weight polyoxyalkylene polyol compounds may be mixed in a molar ratio of about 45:55. The average value on n in the blend may be from about 100 to about 205, for example, n may be about 150.

Polyoxyalkylene polyols generally contain a distribution of compounds with a varying number of oxyethylene units and/or other oxyalkylene average units, and the quoted number of units is the whole real number closest to the statistical average and the peak of the distribution. Whole real number as used herein refers to a number which is a positive integer or fractions of integers.

The acid terminated polyoxyalkylene polyol-containing compounds, either individually or in combination, may then be reacted with at least one polyamine compound, such as at least one diamine compound, to form the polyamidoamine functionalized polyoxyethylene prosurfactant as described herein.

The reaction is performed in a reaction vessel under condensation conditions. Suitable reaction conditions involve heating the starting materials at temperatures ranging from about 100° C. to about 250° C., at atmospheric pressure, and distilling the condensation by-product, water. Along with water, excess polyamine compounds may also be removed by distillation. To further improve the removal of water and any excess polyamine compounds, a vacuum or reduced vessel pressure, such as from about 10 to about 200 mmHg (Torr) may be used following the initial reaction.

In one embodiment of the diamine compound, each amine group of the diamine compound is a primary amine, and the diamine compound has the formula:

$$H_2N-R_3-NH_2 \quad (IV).$$

$R_3$ is a divalent hydrocarbon substituent group selected from the group of a branched or linear aliphatic, a cycloaliphatic, an aromatic substituent group, and combinations and subsets thereof, having 2 to 18 carbon atoms. The divalent hydrocarbon substituent group may optionally contain one or more non-reactive oxygen and/or nitrogen atoms, in the backbone. The nitrogen atoms may be present up to an average of 4 secondary and/or tertiary nitrogen atoms per structure in the $R_3$ group. Oxygen atoms may be present up to an average of 4 atoms or less in the $R_3$ group. Thus, Formula (IV) includes di-secondary amine compounds including the formula $HR_2N-R_3-NHR_2$, and $R_2$ is a substituent group selected from the group of a branched or linear aliphatic, a cycloaliphatic, an aromatic substituent, and combinations and subsets thereof, having 1 to 21 carbon atoms.

Examples of suitable diamines include, for example, m-xylenediamine, 1,3-bis(aminomethyl)cyclohexane, 2-methyl-1,5-pentanediamine, 1,3-pentanediamine, ethylenediamine, diethylenetriamine, triethylenetetramine, polyoxypropylenediamines, 2,2(4),4-trimethyl-1,6-hexanediamine, isophorone diamine, 2,4(6)-toluenediamine, 1,6-hexanediamine, 1,2-diaminocyclohexane, para-diaminodicyclohexyl methane (PACM), and combinations thereof. Suitable oxygen-containing amines include, for example, 1,10-diamino-4,7-dioxadecane, 1,8-diamino-3,6-dioxaoctane, 1,13-diamino-4,7,10-trioxamidecane, and combinations thereof.

The amine according to formula (IV) may be added in a molar excess over the acid terminated polyoxyalkylene polyol-containing compounds. The excess diamine compounds may be added at a molar ratio to the carboxylic acid functional groups from about 6:1 to about 2:1, such as from about 5:1 to about 3:1, for example, from about 4:1 to about 3.2:1. When an excess amount of diamine compounds is used, non-reacted diamine compounds may be removed following the reaction.

Additionally, a monoepoxy compound may be introduced concurrently or sequentially with the diamine to further form the polyamidoamine functionalized polyoxyalkylene prosurfactant. The monoepoxy compound may be a monoepoxy compound as described herein, and may include, for example, a glycidyl ester of a $C_{10}$ tertiary carboxylic acid. The monoepoxy compound may be added at an amount sufficient to control the amount of diepoxy hydrophobe to about 5% to about 40% hydrophobe in a subsequent diepoxy component addition, such as to form an epoxy terminal surfactant and/or an epoxy dispersion.

The reaction temperature between the amidoamine composition and the optional addition of the monoepoxy compounds is not limited. Suitable reaction temperatures range from about 60° C. to about 150° C. and at a vacuum or reduced vessel pressure, such as from about 1 KPa to about 30 KPa.

Suitable monoepoxy compounds include:

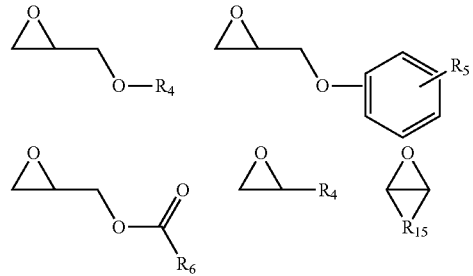

wherein $R_4$ and $R_6$ are the same or different and are a branched or linear alkyl, cycloalkyl, polyoxyalkyl, or alkenyl substituent having from 2 to 100 carbon atoms, optionally branched; and $R_5$ is hydrogen or a branched or unbranched alkyl having 1-18 carbon atoms. There may be more than one type of $R_5$ group attached to the aromatic ring. $R_{15}$ is a divalent alkyl or aryl substituent having from 3 to 20 carbon atoms.

The categories would include the oxiranes of olefins including butylene oxide, cyclohexene oxide, styrene oxide; glycidyl ethers of monovalent alcohols such as methyl, ethyl, butyl, 2-ethylhexyl, and dodecyl alcohols; glycidyl ethers of the alkylene oxide adducts of alcohols having at least 8 carbon atoms by the sequential addition of alkylene oxide to the corresponding alkanol (ROH), such as those marketed under the Neodol® name; glycidyl ethers of monovalent phenols such as phenol, cresol, and other phenols substituted in the o- or p-positions with $C_1$-$C_{21}$ branched or unbranched alkyl, aralkyl, alkaryl, or alkoxy groups such as nonylphenol; glycidyl esters of mono-carboxylic acids such as the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,500, hereby incorporated by reference; glycidyl esters of unsaturated alcohols or unsaturated carboxylic acids such as the glycidyl ester of neodecanoic acid; epoxidized methyl oleate, epoxidized n-butyl oleate, epoxidized methyl palmitoleate, epoxidized ethyl linoleate and the like; allyl glycidyl ether, and acetals of glycidaldehyde.

Specific examples of monoglycidyl capping agents include alkyl glycidyl ethers with 1-18 linear carbon atoms in the alkyl chain such as butyl glycidyl ether or a mixture of $C_8$-$C_{14}$ alkyls, cresyl glycidyl ether, phenyl glycidyl ether, nonylphenylglycidyl ether, p-tert-butylphenyl glycidyl ether, 2-ethylhexyl glycidyl ether, the glycidyl ester of neodecanoic acid, and combinations thereof. Additional examples of suitable monoepoxies include the glycidated monoacids and epoxides formed from alpha olefins and glycidoxyalkylalkoxysilanes.

Commercial examples of preferred monoepoxy resins include, for example, HELOXY® Modifiers 62, 63, 64, 65, and 116, and CARDURA® Resin E-10 all available from Momentive Specialty Chemicals of Columbus Ohio.

The aliphatic based monoepoxy compounds are usually hydrophobic in character, which tends to improve the coalescence properties of the epoxy-curing agent mixture in which the monoepoxy compounds are used at low temperatures, and tends to lower the glass transition temperature of the film or coating. The lower glass transition temperature improves the impact strength of the cured film. Aromatic based monoglycidyl monoepoxy compounds may have the advantage of rendering the cured film more rigid, chemically resistant, and resistant to stresses at high temperatures. Any one of these types of the monoepoxy compounds may be used, and combinations thereof are also advantageous to attain an overall balance of solubility, coalescence, mechanical strength and chemical resistance in the final products.

Alternatively, in another embodiment of the diamine, one amine group is a primary amine, and the other amine group is a secondary amine, and the diamine may have the formula:

$$R_1\text{—}HN\text{—}R_3\text{—}NH_2 \quad (V).$$

$R_3$ is a divalent hydrocarbon substituent group selected from the group of a branched or linear aliphatic, a cycloaliphatic, an aromatic substituent group, and combinations and subsets thereof, having 2 to 18 carbon atoms, and optionally containing one or more non-reactive oxygen atoms and/or nitrogen atoms in the backbone. $R_1$ is a branched or linear aliphatic, a cycloaliphatic, or an aromatic divalent group having 1 to 21 carbon atoms, and optionally containing one or more non-reactive oxygen or nitrogen atoms in the backbone. Each of $R_1$ and $R_3$ may further have a terminal substituent group selected from the group of an alkyl group (i.e., a methyl group), a hydroxyl group, an alkylthio group, and combinations and subsets thereof. Alternatively, $R_1$ and $R_3$ may comprise one common ring.

Alternatively, Formula (V) may be modified to have a second $R_1$ group on the second nitrogen atom. Thus, Formula (V) may include di-secondary amine compounds including the formula $HR_1N\text{—}R_3\text{—}NHR_1$, and $R_1$ is a substituent group selected from the group of a branched or linear aliphatic, a cycloaliphatic, an aromatic substituent, and combinations and subsets thereof, having 1 to 21 carbon atoms.

Examples of suitable diamines containing one primary and one secondary amine group include, for example, N-methylethylenediamine, N-butyl-1,6-hexanediamine, N-cyclohexyl-1,3-propanediamine, N-(2-aminoethyl)piperazine, aminoethylethanolamine, N-methyl-1,4-cyclohexanediamine, N-oleyl-1,3-propanediamine, N-cocoalkyl-1,3-propanediamine, N-(methylthio)ethyl-1,3-propanediamine, N-(linear or branched decyl)oxypropyl-1,3-propanediamine, N-(linear or branched tridecyl)oxypropyl-1,3-propanediamine, N-cocoalkyloxypropyl-1,3-propanediamine, N-(octyl/decyl)oxypropyl-1,3-propanediamine, and combinations thereof.

The amine according to formula (V) may be added in a ratio of equivalents of carboxylic acid functional groups to moles of amine from about 2:1 to about 1:2, such as from about 3:2 to about 2:3, for example, from about 3:2 to about 1:1. As such, in some embodiments, the amine according to formula (V) may be added without a molar excess over the blend of two or more acid terminated polyoxyalkylene polyol-containing compounds. Preferably, no monoepoxy is added, either concurrently or subsequently, to the reaction with the amine compound of formula (V). Any excess amine material may be removed after the amine reaction and/or monoepoxy reaction.

Alternatively, the amine according to formula (V) may be added in a ratio of equivalents of carboxylic acid functional groups to moles of amine from about 2:1 to about 1:2, such as from about 3:2 to about 2:3, from about 3:2 to about 1:1 to a composition having one or more acid terminated polyoxyalkylene polyol-containing compounds. In such an alternative embodiment, monoepoxy may be added concurrently or subsequently to the reaction with the amine compound of formula (V). Any excess amine material may be removed after the amine reaction and/or monoepoxy reaction.

In one aspect, the invention relates to improved epoxy functional surfactants for aqueous dispersions of epoxy resins. Once the amidoamine composition is manufactured, the epoxy functional surfactant is made by reacting the optionally partially end capped amidoamine composition with at least a diepoxy resin having a functionality greater than one epoxide group per molecule. The epoxy functional surfactant may be a non-ionic surfactant formed in situ when reacted with an excess epoxy functional composition. The epoxy component may be an epoxy resin or a mixture of an epoxy resin and a phenolic compound. The polyamidoamine functionalized polyoxyethylene prosurfactant of the amidoamine composition is contacted with the epoxy component under conditions effective to react the amine group and the epoxide group.

An epoxy functional surfactant may be prepared by reacting the polyamidoamine functionalized polyoxyethylene prosurfactant formed from the original blend of polyoxyalkylene polyol compounds with at least one epoxy component having a functionality greater then one epoxide per group under conditions effective to react the amine group and the epoxy group. The epoxy component may have the same stoichiometric ratio or equivalent ratio, or may have a stoichiometric excess or equivalent excess of epoxy substituent groups to amine groups. The equivalent ratio of the amine to epoxy may be at least 1:2, such as in the range of from about 1:6, to about 1:500, for example, in the range of from about 1:6 to about 1:30.

The reaction is typically carried out at a temperature from ambient temperature to an elevated temperature sufficient for reacting the amine group and the epoxide group, such as in the range of from about 50° C. to about 200° C. at atmospheric pressure for a time effective to produce the reaction products. The progress of the reaction can be monitored and targeted to produce the desired product by measuring the epoxy equivalent weight of the reactant mixture. Generally, the reaction mixture is heated until the epoxy equivalents equal to the amine equivalents added are consumed which is generally one hour or greater. More than one epoxy resin can be reacted with the polyamidoamine functionalized polyoxyethylene prosurfactant.

The epoxy components used in producing the surfactant can be any reactive epoxy resin having a 1,2-epoxy, oxirane, equivalency, on the average, greater than one epoxide group per molecule, and in some applications, such from about 1.5 to about 6.5 epoxide groups per molecule. The epoxy resin can be saturated or unsaturated, linear or branched, aliphatic, cycloaliphatic, aromatic or heterocyclic, and may bear substituents which do not materially interfere with the reaction with the carboxylic acid. Such substituents can include bromine or fluorine. The epoxy resin may be monomeric or polymeric, liquid or solid, but is preferably liquid or a low melting solid at room temperature. Generally epoxy components contain a distribution of compounds with a varying number of repeat units.

Suitable epoxy resins include glycidyl ethers prepared by reacting epichlorohydrin with a compound containing at least 1.5 aromatic hydroxyl groups carried out under alkaline reaction conditions. Examples of epoxy resins suitable for use in the invention include in addition to the epoxy resins mentioned above, monoepoxies, diglycidyl ethers of dihydric compounds, epoxy novolacs, cycloaliphatic epoxies, polyglycidyl esters of polycarboxylic acids, glycidyl methacrylate-containing acrylic resins, and combinations thereof.

Further, the epoxy component can be a mixture of epoxy resins that may be reacted with the polyamidoamine functionalized polyoxyethylene prosurfactant. In one such embodiment, the epoxy resin can comprise a monoepoxide resin and a di- and/or a multi-functional epoxy resin, preferably an epoxy resin having a functionality of from about 0.7 to about 1.3 and an epoxy resin having a functionality of at least 1.5, preferably—at least 1.7, more preferably from about 1.8 to about 2.5. The mixture can be added or reacted with the amidoamine composition stepwise or simultaneously. For example, the polyamidoamine functionalized polyoxyethylene prosurfactant of the amidoamine composition can be reacted first with a monoepoxide resin and then with a diepoxy resin. In another example, the epoxy component can be reacted with a novolac epoxy resin and a diepoxy resin stepwise or at the same time in any order.

If desired the surfactant can be recovered from the reaction mixture or made "in-situ." To provide the surfactant in-situ in the desired epoxy component, the polyamidoamine functionalized polyoxyethylene prosurfactant can be reacted into the desired epoxy component. For the in-situ method, the epoxy component should be present in an amount sufficient to provide unreacted epoxy component and the surfactant adduct.

The in-situ method may include providing an epoxy-functional amidoamine prosurfactant where the residue of the epoxy component (hydrophobic moiety), which was reacted with the polyamidoamine functionalized polyoxyethylene prosurfactant, is the same as the bulk epoxy resin that is dispersed. The residue of the epoxy component (hydrophobic moiety) is the same as the bulk epoxy resin when the hydrophobic moiety from the surfactant has the same IR spectrum as the IR spectrum of the bulk epoxy resin. When the surfactant is recovered, the equivalent ratio of the amine to epoxy is preferably within the range of from about 1:30 to about 1:6.

Further, to provide the surfactant in-situ in an advanced epoxy resin, the amidoamine composition can be reacted into the mixtures of diepoxy resins, such as diglycidyl ethers of dihydric phenols, with dihydric phenols during the advancement reaction or can be reacted into the resin after the advancement reaction. In an advancement reaction, generally the diepoxy resin and the dihydric phenol are allowed to react in a molar ratio of about 7.5:1 to about 1.1:1 in the presence of an advancement catalyst, producing an advanced epoxy resin having a weight per epoxy value of from about 225 to about 3,500. Typically, from about 0.1 to about 15 weight percent of the amidoamine composition, based on epoxy resin or epoxy resin and phenolic compound, is used. It is preferred to add the amidoamine composition after the advancement reaction, whether the advanced products are separated or provided as is.

Suitable diepoxy resins may include difunctional epoxy resins, di-epoxy resins, such as a diglycidyl ether of a dihydric phenol, a diglycidyl ether of a hydrogenated dihydric phenol, a branched or linear aliphatic glycidyl ether, epoxy novolac or a cycloaliphatic epoxy.

Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl)propane (bisphenol-A); 2,2-bis(4-hydroxy-3-tert-butylphenyl)propane; 1,1-bis(4-hydroxyphenyl)ethane; 1,1-bis(4-hydroxyphenyl) isobutane; bis(2-hydroxy-1-naphthyl)methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols include advancement products of the above diglycidyl ethers of dihydric phenols with dihydric phenols such as bisphenol-A, such as those described in U.S. Pat. Nos. 3,477, 990 and 4,734,468, which are herein incorporated by reference.

Diglycidyl ethers of hydrogenated dihydric phenols can be produced, for example, by hydrogenation of dihydric phenols followed by a glycidation reaction with an epihalohydrin in the presence of a Lewis acid catalyst and subsequent formation of the glycidyl ether by reaction with sodium hydroxide. Examples of suitable dihydric phenols are listed above.

Aliphatic glycidyl ethers can be produced, for example, by reacting an epihalohydrin with a branched or linear aliphatic diol or aryl diol in the presence of a Lewis acid catalyst, and then by conversion of the halohydrin intermediate to the glycidyl ether by reaction with sodium hydroxide. Examples of preferred aliphatic glycidyl ethers include those corresponding to the formulas:

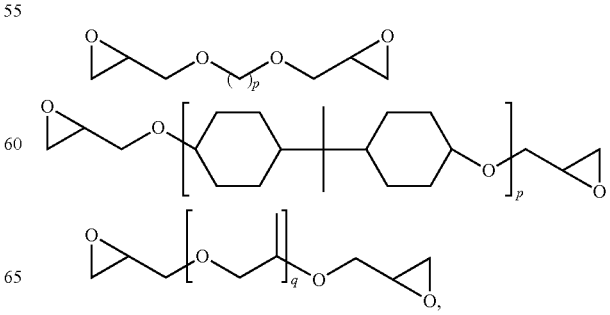

-continued

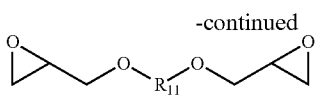

where:
p is an integer from 1 to 12, preferably from 1 to 4,
q is an integer from 4 to 24, preferably from 4 to 12, and
$R_{11}$ may be a divalent cycloaliphatic group having the structures and formulas:

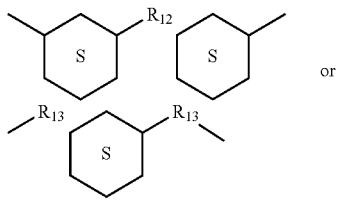

where $R_{12}$ and $R_{13}$ are each independently an alkylene group, or a divalent arylaliphatic group having the formula

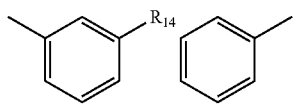

where $R_{14}$ is an alkylene group. The term aliphatic or cycloaliphatic includes compounds having oxygen and/or sulphur atoms in or on the backbone.

Examples of suitable aliphatic glycidyl ethers include for example, diglycidyl ethers of 1,4 butanediol, neopentyl glycol, cyclohexanedimethanol, hexanediol, polypropylene glycol, and like diols and glycols; and triglycidyl ethers of trimethylol ethane and trimethylol propane.

Epoxy novolacs can be produced by condensation of formaldehyde and a phenol followed by glycidation by reaction with an epihalohydrin in the presence of an alkali. The phenol can be for example, phenol, cresol, nonylphenol and t-butylphenol. Examples of the preferred epoxy novolacs include those corresponding to the formula:

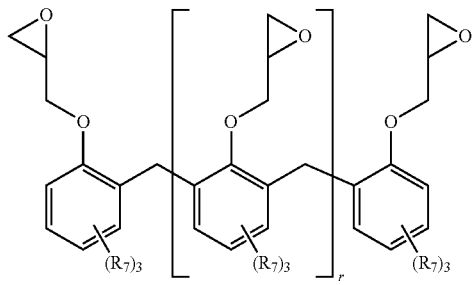

wherein $R_7$ is independently a hydrogen or a $C_1$-$C_{10}$ alkyl group and r is a real number from 0 to 6. Epoxy novolacs generally contain a distribution of compounds with a varying number of glycidated phenoxymethylene units, r. Generally, the quoted number of units is the number closest to the statistical average, and the peak of the distribution.

Cycloaliphatic epoxies can be produced by epoxidizing a cycloalkene-containing compound with more than one olefinic bond with peroxycarboxylic acids, such as peracetic acid. Examples of the preferred cycloaliphatic epoxies include those corresponding to the formulas:

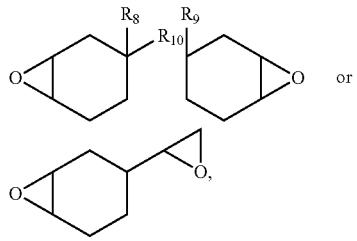

wherein $R_{10}$ is a divalent aliphatic group optionally containing ether or ester group(s) or together with $R_9$ or $R_8$ forming a spiro ring optionally containing heteroatoms, and $R^9$ and $R^8$ are independently hydrogen or $R_9$ or $R_8$ together with $R_{10}$ form a spiro ring optionally containing heteroatoms such as oxygen. Preferably $R_{10}$ contains from 1 to 20 carbon atoms. Examples of cycloaliphatic epoxies include, for example, 3,4-epoxycyclohexylmethyl-(3,4-epoxy)cyclohexane carboxylate, the diepoxy spirodiacetal produced by condensation of about 2 moles of 4-cyclohexenecarboxaldehyde with pentaerythritol followed by epoxidation of the double bonds, bis(3,4-epoxycyclohexylmethyl)adipate, bis(3,4-epoxycyclohexyl)adipate and vinylcyclohexene dioxide[4-(1,2-epoxyethyl)-1,2-epoxycyclohexane]. Cycloaliphatic epoxies include compounds of the structures and formulas of:

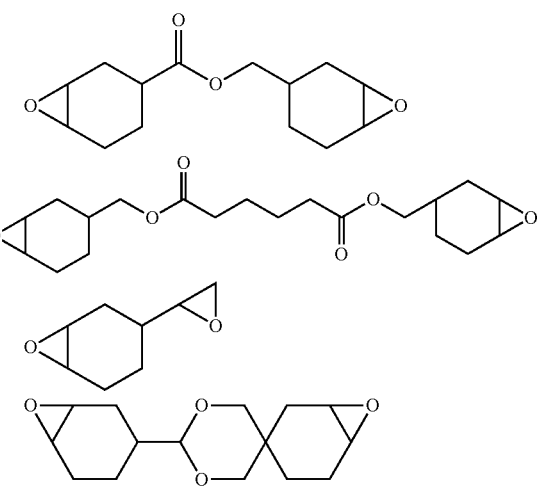

Commercial examples of preferred epoxy resins include, for example, EPON® Resins DPL-862, 828, 826, 825, 1001, 1002, EPONEX® Resin 1510, HELOXY® Modifiers 32, 62, 63, 64, 65, 67, 68, 71, 107, 116, EPON® Resin DPS155, EPON® Resin HPT 1050 and CARDURA® Resin E-10 all available from Momentive Specialty Chemicals of Columbus Ohio, and Epoxy Resins ERL-4221, -4289, -4299, -4234 and -4206 available from Union Carbide.

The reaction of the amidoamine composition with the epoxy component as described above form an epoxy functional surfactant. For in-situ epoxy functional surfactant formation, such as in an excess of epoxy component or in an aqueous dispersion, the epoxy functional surfactant may comprise from about 1 wt. % to about 20 wt. %, such as from about 1 wt. % to about 10 wt. %, for example from about 1 wt. % to about 4 wt. % of the resulting composition.

In one embodiment of the epoxy functional surfactant, the surfactant may have the formula:

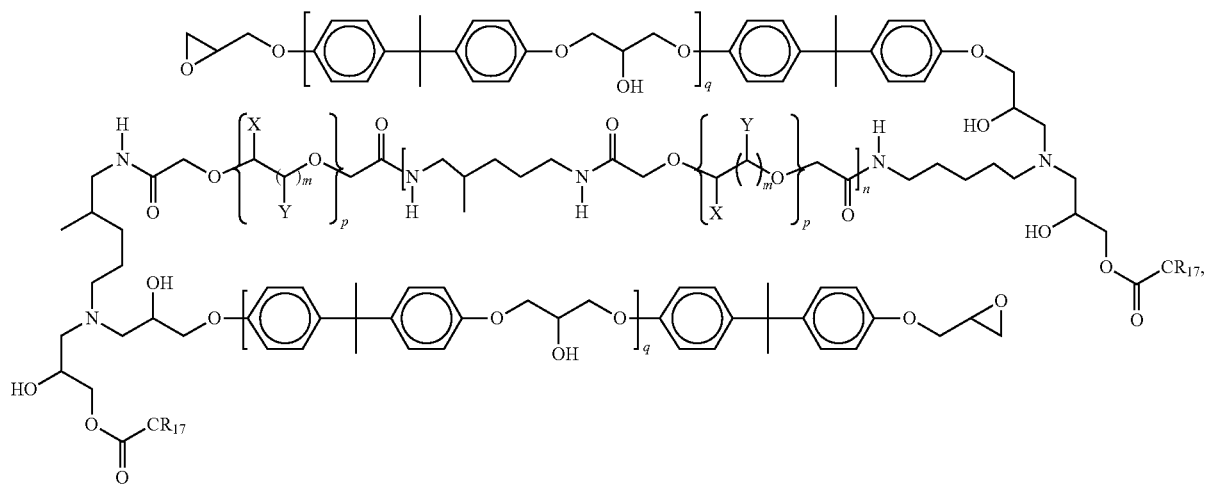

and m may be from 1 to 11, n may be from 1 to 3, q may be from 0 to 8, such as from 0 to 4, and p may be from about 18 to about 500. X may be a hydrogen atom, a methyl substituent, an ethyl substituent, a hydroxymethyl substituent group, subsets thereof, or combinations thereof. Each Y may be a hydrogen atom, a methyl substituent, an ethyl substituent, a hydroxymethyl substituent group, subsets thereof, or combinations thereof. $R_{17}$ may be an alkyl group, an aryl group, an acyl group, and subsets and combinations thereof. $R_{17}$ may further comprise from 1 to 50 carbons, and may further include oxygen, nitrogen, and sulphur atoms.

The epoxy functional surfactant may have the formula:

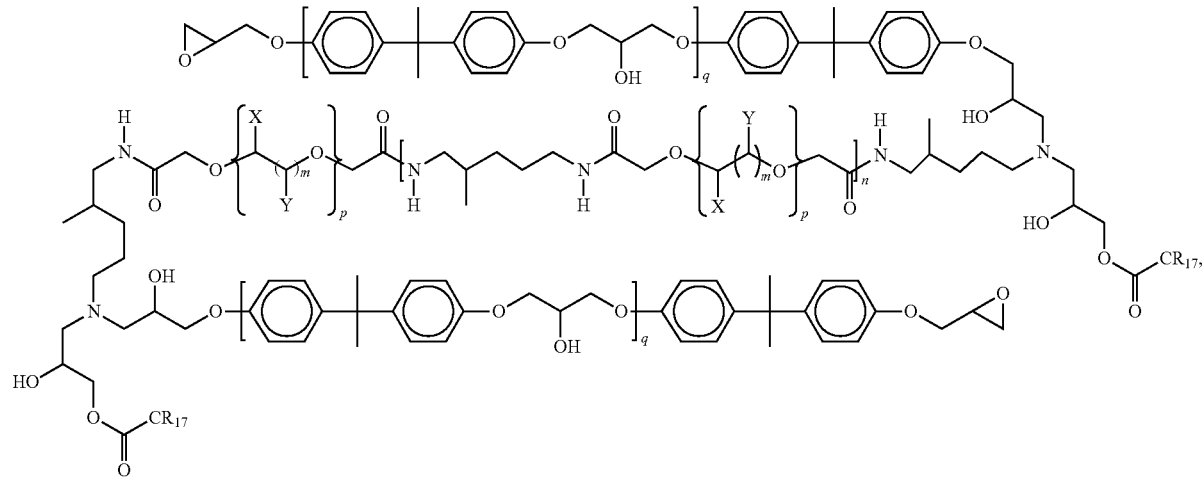

For repeating units, m may be from 1 to 3, n may be 1.2, q may be from 1.9 to 2.3, and p may be from about 81 to about 210. X may be a hydrogen atom or a methyl substituent group. Each Y may be a hydrogen atom or a methyl substituent group. $R_{17}$ may be a tertiary acyl group.

The epoxy functional surfactant may be converted to an amine functional compound. The amine functional compound may be used as a curing agent for an epoxy composition or as a surfactant for an amine polymer composition. The curing agent as described herein can be produced by reacting the epoxy functional surfactants described herein and at least one amine component, such as an amine component, as described herein.

The at least one amine component may include a polyamine. The polyamine may have at least one primary amine group and at least one secondary amine group. A non-limiting example of a polyamine compounds having first and second amine groups is represented by the formula:

(V), and

For repeating units, n may be an average of integers between 1 and 10, preferably between 1 and 4, and $R_{16}$ is a divalent branched or unbranched hydrocarbon radical having from 1 to 24 carbon atoms, one or more aryl or alkylaryl groups, or one or more alicyclic groups, provided that the primary polyamine compound has a total of from 2 to 18 carbon atoms. Preferably, $R_{16}$ is a lower alkylene radical having from 1 to 10, such as from 2 to 6, carbon atoms.

Examples of the polyamine compounds include ethylene polyamines, butylene polyamines, propylene polyamines, pentylene polyamines, hexylene polyamines, heptylene polyamines, and combinations thereof. The higher homologs of such amines and related aminoalkyl-substituted piperazines are also included. Specific examples of polyamines include 1,2-diaminoethane, tris(2-aminoethyl)-amine, 1,2- and 1,3-diaminopropane, 1,2- and 1,4-butanediamine, 2-methyl-1,5-pentanediamine, 1,6-hexanediamine, 1,10-decanediamine, 1,8-octanediamine, 1,4,7-triazaheptane, 1,4,7,10-tetraazadecane, 1,9,17-triazaheptadecane, 2,5,8-trimethyl-1,4,7,10-tetraazadecane, 1,4,7,10,13-pentaazamidecane, 1,4,7,10,13,16-hexaazahexadecane, 1,5,9-triazanonane, 1,3- and 1,4-bis(aminomethyl)benzene, 4,4'-diaminodiphenylmethane, 2,4-diamino-1-methylbenzene, 2,6-diamino-1-methylbenzene, polymethylene polyphenylamine, 1,2-diaminocyclohexane, 1-amino-3-(aminomethyl)-3,5,5-trimethylcyclohexane, 1,3-bis(aminomethyl)cyclohexane, 4,4'diaminodicyclohexylmethane, and combinations thereof. Higher homologs, obtained by condensing two or more of the above-illustrated alkylene amines, are also useful.

The curing agent as described herein can be produced by reacting the epoxy-functional component and at least one amine component in an active amine hydrogen atom to epoxy group ratio of 2:1 or greater, such as from about 5:1 to about 30:1, or example, from about 5:1 to about 15:1, thereby producing an amine-terminated product. The curing agent as described herein has an amine nitrogen equivalent weight of at least 50, preferably at least 65, such as from about 100 to about 400.

Additionally, the amine functional compound can be capped with a monoepoxy compound by reacting the compounds under conditions effective to react the remaining active amine hydrogen atoms with the epoxy groups either before or after dispersion. The amine-terminated product can be reacted with a monoepoxy in a remaining active amine hydrogen atom to epoxy group ratio of 3:1 or greater, such as from about 5:1 to about 10:1, for example about 8:1 to provide a capped product. The reaction is typically carried out at a temperature within the range from about 50° C. to about 100° C. for a time effective to produce the reaction products. Generally, the reaction mixture is heated until the amine equivalents consumed are equal to the epoxy equivalents (essentially all the epoxy groups are consumed).

In one embodiment of the amine functional compound, the amine functional compound may have the following formula and m may be from 1 to 11, n may be from 1 to 2, q may be from 0 to 8, and p may be from about 45 to about 500:

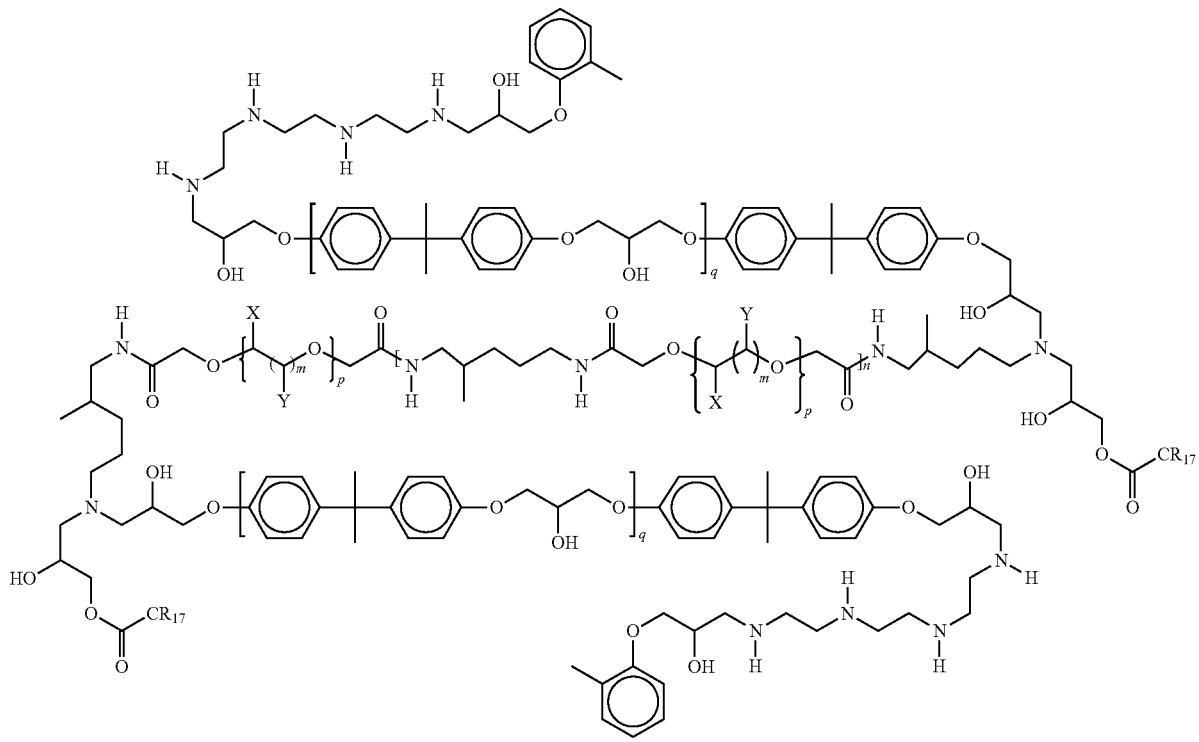

X may be a hydrogen atom, a methyl substituent, an ethyl substituent, a hydroxymethyl substituent group, subsets thereof, or combinations thereof. Each Y may be a hydrogen atom, a methyl substituent, an ethyl substituent, a hydroxymethyl substituent group, subsets thereof, or combinations thereof. $R_{17}$ may be an alkyl group, an aryl group, an acyl group, and subsets and combinations thereof. $R_{17}$ may further comprise from 1 to 50 carbons, and may further include oxygen, nitrogen, and sulphur atoms.

Additionally, a monoepoxy compound may be introduced concurrently or sequentially with the polyamine to further react any pending substituent groups to form the amine functional compound. The monoepoxy compound may be any of the monoepoxy compounds as described herein. Specific examples of monoepoxide capping agents include alkyl glycidyl ethers with 1-18 linear carbon atoms in the alkyl chain such as butyl glycidyl ether or a mixture of $C_8$-$C_{14}$ alkyl, glycidyl ethers, cresyl glycidyl ether, phenyl glycidyl ether, nonylphenylglycidyl ether, p-tert-butylphenyl glycidyl ether, 2-ethylhexyl glycidyl ether, the glycidyl ester of neodecanoic acid, and combinations thereof.

Further, the curing agent as described herein can be dispersed in an aqueous solution. The dispersion may contain water and the curing agent as described herein. Such composition can be provided by mixing the water in the curing agent as described herein before capping or after capping with or without the presence of a surfactant. Any conventional surfactant useful for emulsification or dispersion of curing agents in aqueous solutions can be used. However, the curing agents as described herein are self-emulsifiable and do not need any additional surfactant(s) to provide the aqueous curing agent solution, emulsion or dispersion.

The amine functional compound, also referred to as an amine functional adducted polymer, may be dispersed in water to give a white dispersion with an average micron particle size diameter of Dv from about 0.2 to about 1, for example, about 0.516, and Sa from about 0.2 to about 0.7, for example, about 0.423. The non volatile content of this dispersion may be from about 50% to about 55%, for example, about 51.6% and the non volatile amine polymer amine value may be from about 225 to about 275, for example, about 257. This amine functional polymer dispersion may be used in combination with an epoxy dispersion as described herein to make the high performance primer paint, such as described in Example 18.

The curing agent as described herein can be useful to cure a liquid or a solid epoxy resin, neat, in organic solvents or in water. Any epoxy resin described herein to produce the curing agent as described herein can be cured by the curing agent as described herein. The curing agent can be useful for ambient coating applications as well as bake coating applications. The cure temperature can vary depending on the application, typically in the range of about 5° C. to about 200° C.

These curing agents as described herein can be used to effectively cure an aqueous epoxy resin system. Preferred examples of the aqueous epoxy resins are bisphenol-A based epoxy resins having from 350 to about 10,000 molecular weight non-ionically dispersed in water with or without glycol ether co-solvents. Commercial examples of the aqueous epoxy resins include, for example, EPI-REZ™ Resin 3520, 3522, 3540 and 5522 available from Momentive Specialty Chemicals, Inc. The curing agents as described herein are compatible with aqueous dispersions without using acid salts. These curable systems contain, water, one or more epoxy resins and one or more curing agents as described herein. These aqueous curable epoxy resin systems can be cured at room temperature or at elevated temperatures or further catalyzed with a commercially available tertiary amine accelerator, such as 2,4,6-tris(dimethylaminomethyl phenol) or other phenols to cure at lower temperatures. Examples of such materials are EPI-KURE™ Curing Agent 3253 from Momentive Specialty Chemicals, Inc. or DMP-30 from Rohm and Haas. These low temperatures typically range from about 5° C. to about 20° C. For the aqueous epoxy resin systems, the typical cure temperature with or without an accelerator ranges from about 5° C. to about 200° C. Typically these curing agents are used to formulate thermoset coatings that have good corrosion protection of the coated substrate.

Aqueous Epoxy Resin Dispersions

An aqueous epoxy dispersion may include water, at least one epoxy resin as described herein, and the polyamidoamine functionalized polyoxyalkylene prosurfactant, which prosurfactant may either be epoxy functionalized in situ with the at least one epoxy resin and may be epoxy functionalized prior to contacting the at least one epoxy resin of the dispersion.

The aqueous epoxy resin dispersions formed herein as described above exhibited several improved properties over prior art dispersions. One improved property is improved shelf stability as demonstrated by the improved stability of the epoxy content, improved stability of the pH, and improved stability of viscosity.

In one aspect, an improved or equivalent viscosity over time was observed for the blend based surfactants herein used to form the epoxy resin dispersions described herein as compared to the non-blend prior art compositions. In one example, an aqueous epoxy resin dispersion formed from the co-amidification of acid terminated polyoxyalkylene polyol-containing composition of a 55:45 blend of 4000 Mw/8000 Mw molecular weight polyoxyethylene glycol components as formed in Example 10 below was observed to have a viscosity of less than 1700 cps after 8 months, less than 1800 cps after 10 months, and less than 1900 cps after 15 months of storage. In contrast, 4000 MW polyoxyethylene glycol based compositions and 4600 MW polyoxyethylene glycol based compositions each exhibited viscosities of greater than 4,000 cps at 8 months.

The aqueous dispersions formed herein were observed to have a change from about 0 to about 3 pH units at a period of time to double viscosity or exceed 6000 cps. Further examples of these improvements are shown in the examples and tables described herein.

In one aspect, the average particle size in the aqueous epoxy resin dispersions formed herein as described herein is on the order of less than 1.50 μm, such as from about 0.2 to about 1.2 μm, for example, from about 0.65 to about 0.87 μm in size and comparable with prior art from about 0.74 to 0.88 in size. It is desirable to use as small a particle size as possible at as high an epoxy polymer content as possible to obtain improved economics and improved coalescence, thereby obtaining optimum film mechanical properties and chemical properties.

In a typical aqueous dispersion as described herein useful for coating applications, the amount of the epoxy resin component, which includes the epoxy functional surfactant, (also known as the solids content or non-volatile content) may be from about 20 to about 75 percent by weight, preferably from about 55 to about 65 percent by weight, based on the total dispersion. Generally, water and an epoxy resin having a functionality of greater than 0.8 epoxide group per molecule are mixed under conditions effective to provide an oil-in-water emulsion in the presence of an epoxy-functional surfactant mentioned above in an amount ranging from about 1 wt % to about 6 wt %, such as from about 2 wt % to about 5 wt %, for example, from about 3.5 wt % to less than 4.5 wt %, based on the weight of solids. Given that the efficiency of the epoxy functional surfactant as described herein is increased, the amount required to disperse the epoxy resin is reduced.

Identifying the epoxy resin separately from the epoxy functional surfactant is for convenience only since the epoxy functional surfactant may be made in situ in the epoxy resin. The dispersions can be made by adding the surfactant and water to the epoxy resin to be dispersed or by producing the surfactant "in-situ" as described above. These dispersions can also be made by adding the epoxy resin to the amidoamine composition and water. The surfactant can be produced in-situ by adding polyamidoamine functionalized polyoxyalkylene prosurfactant to the epoxy resin at an effective temperature to react the amidoamine and epoxy resin, or by adding the polyamidoamine functionalized polyoxyalkylene prosurfactant to a difunctional epoxy resin and dihydric phenol before or during the advancement reaction as described above.

One or more epoxy-functional amidoamine prosurfactants can be used. Optionally, a co-surfactant can be used along with the epoxy functional surfactant. Optionally, the dispersion also contains acetone. In one embodiment, the dispersion contains acetone and at least one non-volatile hydrophobic liquid resin or resin modifier. Acetone may be present in an amount of about 0.5 wt. % or greater, more preferably in an amount from about 1 wt. % to about 3 wt. %, such as about 1.5 wt. %.

Useful coating compositions can be obtained by mixing an amine-functional epoxy resin curing agent with the aqueous epoxy resin dispersion mentioned above. The aqueous epoxy resin dispersions and curing agents described above can serve as components of paints and coatings for application to substrates such as, for example, metal and cementitious structures. To force the coating composition cure to completion, the coatings obtainable from these dispersions may also be heated for about 30 to about 120 minutes at an elevated temperature, preferably within the range of about 50° C. to about 120° C.

To prepare such paints and coatings, the aqueous epoxy resin dispersions and/or curing agents are blended with primary, extender and anti-corrosive pigments, and optionally, additives such as surfactants, antifoam agents, rheology modifiers and mar and slip reagents. The epoxy resin coating composition as described herein may include other additives, such as elastomers, stabilizers, extenders, plasticizers, pigment pastes, antioxidants, leveling or thickening agents, and/or co-solvents, wetting agents, co-surfactants, reactive diluents, fillers, catalysts, and combinations thereof. The selection and amount of these pigments and additives depends on the intended application of the paint and is generally recognized by those skilled in the art.

The reactive diluent can be any non-volatile, hydrophobic compound which is liquid and flowable at room temperature, whether neat or in a hydrophobic solvent such as xylene or butanol. A substance is non-volatile when it meets the definition according to ASTM D 2369-93 or ASTM D 3960-93. For a coating composition, the reactive diluent (also known as a hydrophobic liquid resin or resin modifier) must be compatible (e.g. does not detract from corrosion resistance, or high gloss, etc.) with the curing agents in the coating composition, for example, such as amine curing agents.

A reactive diluent may be present in an amount up to about 25 wt. %, such as from about 1 to about 10 wt. % based on the total amount of components. Preferable reactive diluents include, for example, aliphatic monoglycidyl ethers, urea formaldehyde resins or aliphatic monoglycidyl esters. Preferable monoepoxide diluents are those which contain a water-immiscible glycidated $C_{8-20}$ aliphatic alcohol, $C_{1-18}$ alkylphenol glycidyl ether, or glycidated tertiary carboxylic acid. The monoepoxide component can contain alicyclic and aromatic structures, as well as halogen, sulfur, phosphorus, and other such heteroatoms. Reactive diluents can be, for example, epoxidized unsaturated hydrocarbons such as decene and cyclohexene oxides; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is the glycidyl ether of monohydric $C_{8-14}$ aliphatic alcohols. Reactive diluents are commercially available as HELOXY™ 7 Modifier ($C_8$-$C_{10}$ alkyl glycidyl ether), HELOXY™ 9 Modifier ($C_{10-11}$ alkyl glycidyl ether) from Momentive Specialty Chemicals and CYMEL UF™ 216-10 Resin (alkylated urea formaldehyde high solids solution) from Cytec Industries Inc. The aqueous dispersion may also contain a monoepoxide diluent as a reactive diluent.

Examples of primary pigments include rutile titanium dioxide, such as KRONOS® 2160 (Kronos, Inc.) and TI-Pure® R-960 from Du Pont, buff titanium dioxide, red iron oxide, yellow iron oxide and carbon black. Examples of extender pigments include calcium metasilicate, such as 10ES WOLLASTOKUP® (NYCO Minerals, Inc.), barium sulfate, such as SPARMITE® (Harcros Pigments, Inc.) and aluminum silicate, such as ASP® 170 (Englehard Corp.). Examples of anticorrosive pigments include calcium strontium phosphosilicate, such as HALOX SW111 (Halox Pigments), zinc ion modified aluminum triphosphate, such as K-WHITE® 84 (Tayca Corp.) and basic aluminum zinc phosphate hydrate, such as HEUCOPHOS® ZPA (Heuco Tech, Ltd.).

Additional surfactants can be included in waterborne epoxy paints and coatings to improve both pigment and substrate wetting. Such surfactants are typically non-ionic, examples of which include TRITON® X-100 and TRITON X-405 (Dow Chemical Company), and SURFYNOL® 104 (Air Products and Chemicals).

Anti-foam agents and defoamers suppress foam generation during manufacture of the paint or coating. Useful defoamers include DREWPLUS® L-475 (Drew Industrial Div.), DEE FO® PF-4 Concentrate (Ultra Additives) and BYK® 033 (BYK-Chemie).

Rheological additives are employed to obtain proper application properties. There are three types of additives that provide the desired thickening and shear thinning required for waterborne epoxy coatings; namely, hydroxyethylcellulose, organically modified hectorite clays and associative thickeners. NATROSOL® 250 MBR and NATROSOL Plus (Aqualon) are examples of modified hydroxyethyl-cellulosics and BENTONE® LT (RHEOX, Inc.) is representative of a hectorite clay. Optiflo™ (Southern Clay) is a useful associative thickener.

Mar and slip agents improve early resistance to abrasion from scrubbing or light foot traffic. Polydimethylsiloxanes and polyoxyethylene waxes are used in this regard. An example of a commercially available wax slip agent is MICHEM LUBE® 182 (MICHELMAN, INC.).

The curable paint and coating compositions can be applied to a substrate by brush, spray, or rollers. The aqueous dispersions of the instant invention can also be used as components of adhesives and fiber sizing.

Other uses for the pro-surfactants, surfactants, aqueous dispersion and curing agents as described herein may include moisture control membranes for curing concrete as well as thin adhesives for multi-layered metal laminates.

Additionally, the epoxy resin curing agent can be any curing agent effective to cure (or crosslink) the epoxy resin dispersed in the aqueous solution including the curing agents made from the epoxy functional amidoamine prosurfactant described herein. The curing agents are generally water compatible (i.e., dilutable and/or dispersable).

Other suitable curing agents or co-curing agents for use with the dispersions include those typically employed with epoxy resins, such as aliphatic, arylaliphatic and aromatic amines, polyamides, amidoamines and epoxy-amine adducts, melamine formaldehyde resins and phenolic formaldehyde resins. The curing agents exhibit varying levels of compatibility with water, depending upon the nature of the starting materials employed for their preparation.

Preferably, for curing at room temperature or lower temperatures, the other suitable curing agents or co-curing agents may have an epoxide equivalent to amine hydrogen equivalent combining ratio of from about 1:0.75 to about 1:1.5. Such other suitable curing agents or co-curing agents may include polyalkylene amine curing agents are those which are soluble or dispersible in water and which contain more than 2 active hydrogen atoms per molecule such as diethylenetriamine, triethylenetetramine, tetraethylenepentamine, etc. Examples include 1,6-hexanediamine, 1,3-pentanediamine, 2,2(4),4- trimethyl-1,6-hexanediamine, bis(3-aminopropyl)piperazine, N-aminoethylpiperazine, N,N'-bis(3-aminopropyl)ethylenediamine, 2,4(6)-toluenediamine and also cycloaliphatic amines such as 1,2-diaminocyclohexane, 1,4-diamino-2,5-diethylcyclohexane, 1,2-diamino-4-ethylcyclohexane, 1,2-diamino-4-cyclohexylcyclohexane, isophoronediamine, norbornanediamine, 4,4'-diaminodicyclohexylmethane, 1,1-bis(4-aminocyclohexyl)ethane, 2,2-bis(4-aminocyclohexyl)propane, 3,3'-dimethyl-4,4'-diaminodicyclohexylmethane, 3-amino-1-(4-aminocyclohexyl)propane, 1,3- and 1,4-bis(aminomethyl)cyclohexane, and combinations thereof. As araliphatic amines, in particular those amines are employed in which the amino groups are present on the aliphatic radical, for example, m- and p-xylylenediamine or their hydrogenation products. The amines may be used alone or as mixtures.

For higher temperature cure applications, aminoplast resins can be used as curing agents for epoxy resins having a high equivalent weight, e.g. greater than 700. Generally, from about 5 to about 40, such as from about 10 to about 30, for example, about 30 weight percent of aminoplast resins, based on the combined weight of the epoxy resin and aminoplast resin, is used. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Examples of aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexakis(methoxymethyl)melamine, methylated polymeric melamine-formaldehyde resins and butylated polymeric melamine-formaldehyde resins.

Commercial examples of water-compatible curing agents include EPI-CURE™ 8540, 8537, 8290 and 6870 Curing Agents (available from Momentive Specialty Chemicals), ANQUAMINE 401, Casamid 360 and 362 curing agents (Air Products); Hardener HZ350, Hardeners 92-113 and 92-116 (Huntsman); BECKOPDX EH659W, EH623W, VEH2133W curing agents (Cytec) and EPOTUF 37-680 and 37-681 curing agents (Reichhold Chemical Co.).

The curable epoxy resin composition can be cured at a temperature within the range of from about 5° C. to about 200° C., such as from 20° C. to about 175° C., for a time effective to cure the epoxy resin.

EXAMPLES

The following examples are provided to illustrate certain embodiments as described herein. The examples are not intended to limit the scope of the application and they should not be so interpreted. Amounts are in weight or volume parts or in weight or volume percentages unless otherwise indicated.

Testing Methods

Viscosities were determined on the obtained emulsion or dispersion by means of a Brookfield Synchro Lectric Viscometer from Brookfield Engineering Laboratories.

The determination of emulsion and dispersion particle sizes was accomplished with a Brookhaven Bi-DCP Particle Sizer from Brookhaven Instruments Corporation and Coulter LS230 unless otherwise specified. Dn is number average particle size diameter, Dw is mass average particle size diameter, Dv is volume average size diameter, and Sa is surface area average particle size diameter. All particle size data is reported in micrometers, μm.

Amine values are reported as milligrams of KOH that is equivalent to basic nitrogen content of an one gram sample, determined by acid-base titration, ASTM D2896 test process.

The acid equivalent weight/carboxyl equivalent weight was determined by the ASTM D1639 testing procedure.

The amine nitrogen equivalent weight was theoretically determined by batch calculations using reactant equivalent weights and batch mass balance.

Epoxy equivalent weights were determined by ASTM D1652 and D4142 testing procedures.

Examples of compositions and processes to form the compositions are presented as follows.

EXAMPLE 1A is a comparative example of a state of the art composition and process of the oxidation of polyoxyethylene glycol (PEG) having 4600 number average molecular weight and a high carboxyl level (U.S. Pat. No. 6,956,086 B2 Example 1).

To a stainless steel reactor with a capacity of approximately 1150 liters, 601.5 Kg of PEG 4600 and 45.4 Kg of water were added to form a mixture. The mixture was heated to 60° C. and stirred to dissolve the PEG. Then, 5.41 Kg of 4-hydroxy-2,2,6,6,tetramethylpiperidine-1-oxyl free radical (4-hydroxy TEMPO) and a mixture of 7.14 Kg of 67% nitric acid and 21.9 Kg of water were charged to the reactor while stirring. The reactor vent was then closed and oxygen was added to the reactor. Sufficient oxygen was added to bring and keep the reactor at an oxygen pressure of 25 psig (172 kPa) in addition to the air which was in the reactor before oxygen addition. The reactor was kept at 57-63° C. while stirring for 4 hours as additional oxygen was added from the cylinder through a regulator set to keep the added oxygen pressure at 172 kPa. At this point, the cylinder pressure had dropped by 1975 psig (13.62 MPa), indicating that 8.38 Kg of oxygen had been transferred from the cylinder to the reactor. The oxygen flow was then turned off and the reaction was continued for two additional hours at this temperature while stirring in order to consume most of the oxygen in the headspace of the reactor.

At the end of this time, the pressure of added oxygen in the reactor headspace had dropped to 9.6 psig (66 kPa) and the rate of oxygen consumption had become very slow. The remaining oxygen was vented and vacuum was applied to the reactor to bring the absolute pressure down to 13.5 kPa. The reactor temperature was increased to 93° C. to distill the water and remaining nitric acid into the overhead accumulator. Distillation was continued for 1.5 hours. Vacuum was broken to sample the product for acid equivalent weight. The acid equivalent weight was 2382, corresponding to 93% oxidation of the alcohol end groups. The overhead accumulator was drained. This oxidized PEG was used to make the comparative, state of the art, polyamidoamine prosurfactant in Example 4.

Example 1B is an example of the oxidation of polyoxyethylene glycol (PEG) having 4600 number average molecular weight to a high carboxyl level.

To a stainless steel reactor with a capacity of approximately 57 liters 30 Kg of PEG 4600 (with a hydroxyl equivalent weight of 2300) and 2.53 Kg of water were added to form a mixture. The mixture was heated to 60° C. and stirred to dissolve the PEG. Then, 0.54 Kg of 4-hydroxy TEMPO (dissolved in 1.08 Kg of water) and a mixture of 0.18 Kg of 67% nitric acid and 0.45 Kg of water were charged to the reactor while stirring. The reactor vent was then closed and oxygen was added to the reactor from a cylinder with a regulator. Sufficient oxygen was added to bring and keep the reactor at an oxygen pressure of 25 psig (170 kPa) in addition to the air which was in the reactor before oxygen addition. The reactor was kept at 60° C. while stirring for 9.5 hours as additional oxygen was added from the cylinder through a regulator set to keep the added oxygen pressure at 170 kPa. Samples were periodically withdrawn from the reactor and the carboxyl equivalent weight of the solid fraction (which could be used in turn to calculate the percentage oxidation) was determined on the dried sample by titration.

After 9.5 hours a final sample was taken and the flow of oxygen to the reactor was stopped while the sample was being analyzed. Titration of the dried sample showed a carboxyl equivalent weight of 2440, corresponding to conversion of 94.3% of the hydroxyl groups to carboxyl. When the analytical result was obtained, the oxygen in the reactor was vented and the reactor was purged with nitrogen.

Then, the reactor temperature was increased to approximately 105° C. as the reactor pressure was reduced to approximately 1700 Pa. Water and other volatiles were distilled from the reactor for approximately 3 hours until the offtake of distillate had essentially stopped. The molten product remaining in the reactor was then loaded out into pails. The product had an acid equivalent weight of 2410 without post-drying and 2440 on a sample dried for 15 minutes in an air oven at 150° C. The latter value corresponded to an extent of oxidation of the hydroxyl end groups to carboxyl of 94.7%.

EXAMPLE 2 is an example of the oxidation of polyoxyethylene glycol (PEG), 4000 number average molecular weight, to a high carboxyl level.

To a stainless steel reactor with a capacity of approximately 57 liters 30 Kg of PEG 4000 (with a hydroxyl equivalent weight of 2085) and 2.95 Kg of water were added to form a mixture. The mixture was heated to 60° C. and stirred to dissolve the PEG. Then, 0.57 Kg of 4-hydroxy TEMPO (dissolved in 1.06 Kg of water) and a mixture of 0.18 Kg of 67% nitric acid and 0.45 Kg of water were charged to the reactor while stirring. The reactor vent was then closed and oxygen was added to the reactor from a cylinder with a regulator. Sufficient oxygen was added to bring and keep the reactor at an oxygen pressure of 35 psig (240 kPa) in addition to the air which was in the reactor before oxygen addition. The reactor was kept at 56-61° C. while stirring for 5.5 hours as additional oxygen was added from the cylinder through a regulator set to keep the added oxygen pressure at 240 kPa. Samples were periodically withdrawn from the reactor and the carboxyl equivalent weight of the solid fraction (which could be used in turn to calculate the percentage oxidation) was determined on the dried sample by titration.

After 5.25 hours the carboxyl equivalent weight of the solid fraction was 7620 which corresponded to conversion of 27.4% of the hydroxyl groups to carboxyl. To raise the oxidation rate, the oxygen pressure was increased to 50 psig (345 kPa above the pressure of the starting air) after 5.5 hours. Reaction was continued at the increased pressure for one additional hour before the reactor was vented and the reaction was stopped for the evening.

Then, the reactor was pressurized with oxygen to 50 psig (345 kPa) above atmospheric and reheated to 56-61° C. The mixture was held at this temperature and oxygen pressure, while stirring, for 4.5 additional hours. At the end of this time a sample was taken and the flow of oxygen to the reactor was stopped while the sample was being analyzed. Titration of the dried sample showed a carboxyl equivalent weight of 2597, corresponding to conversion of 80.3% of the hydroxyl groups to carboxyl. When the analytical result was obtained, the oxygen in the reactor was vented and the reactor was purged with nitrogen. The product was then diluted with water to a solids content of 52% (to retard crystallization of the oxidized PEG from solution) and loaded from the reactor into pails. Titration of a dried sample of the final product showed a carboxyl equivalent weight of 2416, corresponding to conversion of 86.3% of the hydroxyl groups to carboxyl. This oxidized PEG was used to make the polyamidoamine prosurfactants described in Example 5 and in a blend in Example 7.

Example 3 is an example of the oxidation of polyoxyethylene glycol (PEG), 8000 number average molecular weight, to a high carboxyl level.

To a stainless steel reactor with a capacity of approximately 57 liters 30 Kg of PEG 8000 (with a hydroxyl equivalent weight of 4057) and 2.95 Kg of water were added to form a mixture. The mixture was heated to 60° C. and stirred to dissolve the PEG. Then, as in Example 2, 0.57 Kg of 4-hydroxy TEMPO (dissolved in 1.06 Kg of water) and a mixture of 0.18 Kg of 67% nitric acid and 0.45 Kg of water were charged to the reactor while stirring. The reactor vent was then closed and oxygen was added to the reactor from a cylinder with a regulator. Sufficient oxygen was added to bring and keep the reactor at an oxygen pressure of 50 psig (345 kPa) in addition to the air which was in the reactor before oxygen addition. The reactor was kept at 56-61° C. while stirring for 5.8 hours as additional oxygen was added from the cylinder through a regulator set to keep the added oxygen pressure at 345 kPa. Samples were periodically withdrawn from the reactor and the carboxyl equivalent weight of the solid fraction (which could be used in turn to calculate the percentage oxidation) was determined on the dried sample by titration. After 5 hours the carboxyl equivalent weight of the solid fraction was 7114 which corresponded to conversion of 57.0% of the hydroxyl groups to carboxyl. After 5.8 hours the reactor was vented and the reaction was stopped for the evening.

Then, a sample was taken again and the carboxyl equivalent weight of the solid fraction was 6158 which corresponded to conversion of 65.9% of the hydroxyl groups to carboxyl. The reactor was pressurized with oxygen to 50 psig (345 kPa) above atmospheric and reheated to 56-61° C. The mixture was held at this temperature and oxygen pressure, while stirring, for 2 additional hours. At the end of this time a sample was taken and the flow of oxygen to the reactor was stopped while the sample was being analyzed. Titration of the dried sample showed a carboxyl equivalent weight of 4995, corresponding to conversion of 81.2% of the hydroxyl groups to carboxyl. When the analytical result was obtained, the oxygen in the reactor was vented and the reactor was purged with nitrogen. The product was then diluted with water to a solids content of 52% (to retard crystallization of the oxidized PEG from solution) and loaded from the reactor into pails. Titration of a dried sample of the final product showed a carboxyl equivalent weight of 4940, corresponding to conversion of 82.1% of the hydroxyl groups to carboxyl. This oxidized PEG was used to make the polyamidoamine prosurfactants in Example 6 and in a blend in Example 7.

EXAMPLE 4A is a comparative example of the preparation of a state of the art amidoamine prosurfactant composition using the product of Example 1A as the starting raw material (U.S. Pat. No. 6,956,086 B2 Example 1).

The reactor contents of Example 1A were then cooled to 68° C. and 123.1 Kg of 2-methyl-1,5-pentanediamine, Dytek A, were then charged to the reactor. The reactor temperature was raised to 202° C. over a period of 2.5 hours as a mixture of water and some of the diamine was allowed to distill at atmospheric pressure. When the reactor contents had reached this temperature, the overhead accumulator was drained and vacuum was applied to strip the remaining diamine. After 2.75 hours, the reactor pressure was 3 kPa, the temperature was 209° C. and a nitrogen sparge was applied to promote the stripping of excess diamine. Stripping was continued for 4.5 additional hours with vacuum and nitrogen. Vacuum was broken and the reactor contents were sampled; the amine nitrogen equivalent weight was 2905.

The reactor was then cooled to 104° C. and charged with 317.6 Kg of water to dissolve the product, followed by 38.1 Kg of CARDURA E-10 (a glycidyl ester of a $C_{10}$ tertiary carboxylic acid). The mixture was stirred at 93° C. for one hour to react the epoxy groups of the CARDURA E-10 with the amine groups of the oxidized polyoxyethylene glycol-diamine condensate. Solids content was measured and 63.5 Kg of additional water was added to adjust solids concentration to the desired level. The product was loaded out into drums.

The final product had a solids concentration of 63.7% and an amine nitrogen equivalent weight of 3281 (solids basis). Gel permeation (size exclusion) chromatography of the product (polyoxyethylene glycol calibration) showed a low molecular weight peak at a peak molecular weight of 4590 (64.2% of area) and a high molecular weight peak at a peak molecular weight of 9268 (31.4% of area, probably corresponding to coupled material). The remaining area corresponded to material of a few hundred molecular weight. No particular broadening of the lower molecular weight peak into the low molecular weight region, corresponding to chain scission, was observed. The total mixture had a number average molecular weight of 3758 and a weight average molecular weight of 6260. The percentage of oligomeric amidoamine compounds present in the amidoamine composition was 31.4% based on GPC. The polydispersity, PD, was relatively low and the $M_z$ was relatively low (Table II.).

This Example 4A prosurfactant forms an efficient in situ epoxy dispersion surfactant for low viscosity and small particle size as demonstrated by Example 8 in Tables III, IV, and V). However, as also shown the viscosity, the epoxy equivalent weight, and the particle diameter increase significantly with time, thus routinely providing a very limited shelf life of less than one year.

Example 4B is an example of the preparation of condensates of product of Example 1 with alkylated 1,3-propanediamines and their aqueous solutions.

A 1-liter, 4-neck round bottom flask was equipped with a paddle stirrer, thermocouple, distillation takeoff, and vacuum takeoff/nitrogen purge. To the flask was charged the amounts shown in Table I of the product of Example 1B (after stripping of volatiles) and the following amines: A, a N-oleyl trimethylenediamine, B, a N-(branched tridecyloxypropyl)trimethylenediamine, and C, a N-((octyl/decyl)oxypropyl)trimethylenediamine mixture.

The flask was purged with nitrogen and heated to 215° C. at the maximum heating rate set by the temperature controller. Water distilled from the reaction mixtures as the amide formation reaction proceeded. The reaction mixtures were held for 1 hour at 215° C. under nitrogen at atmospheric pressure and then for 30 minutes (1 hour in the case of mixtures 3 and 5) at this temperature at a reduced pressure of 80-160 Pa. The reaction mixtures were then cooled to approximately 90° C. and water was added to make aqueous solutions. The percentage solids and 25° C. Brookfield viscosity of the aqueous solutions were determined. The solutions were also analyzed by gel permeation chromatography (GPC). The GPC chromatogram of each solution showed three peaks, with a low molecular weight peak at MW 1000-1200, a medium molecular weight peak at MW 4300-4600 (similar to the position of the main peak in the starting material), and a high molecular weight peak at MW 9300-9800. The area percentage of each peak was calculated and is shown in Table I below.

TABLE I

| Mixture# | 1 | 2 | 3 | 4 | 5 |
|---|---|---|---|---|---|
| Product of Example 4, acid equiv. | 438.25 0.1796 | 438.25 0.1796 | 438.25 0.1796 | 438.25 0.1796 | 438.25 0.1796 |
| Diamine | A | B | B | C | C |
| Diamine, amine nitrogen equiv. wt. | 171.94 | 165.76 | 165.76 | 137.5 | 137.5 |
| Diamine, grams | 61.75 | 59.53 | 44.65 | 49.38 | 37.03 |
| amine nitrogen equiv. | 0.359 | 0.359 | 0.269 | 0.359 | 0.269 |
| Nitrogen equivalents: diamine/equiv acid | 2 | 2 | 1.5 | 2 | 1.5 |
| Distillate, grams | | 46.6 | 14 | | 14.5 |
| Added water, grams | 275 | 275 | 275 | 275 | 275 |
| Product, grams | 691 | 690 | 739 | 719 | 729 |
| Product, % solids | 65.34 | 66.64 | 62.11 | 62.72 | 62.07 |
| Viscosity, Brookfield, 25° C., Pa-s | 153 | 3.57 | 3.11 | 0.776 | 0.83 |
| GPC, peak % area: | | | | | |
| Low | 17.5 | 17.1 | 27.8 | 18.8 | 28.4 |
| Medium | 69.7 | 69.1 | 54.8 | 66.4 | 53.2 |
| High | 12.8 | 13.9 | 17.5 | 12.8 | 18.4 |

One can see from Table I that the ether diamines B and C produced condensates much lower in aqueous solution viscosity than that from the long chain hydrocarbon diamine A.

EXAMPLE 5 is an example of the preparation of an amidoamine prosurfactant composition using the product of Example 2 as the starting raw material.

To a resin flask equipped with agitation, a heating mantle, a nitrogen sparge and a vacuum system were added 1200.0 grams of aqueous, carboxylated polyoxyethylene oxide from Example 2. The water was removed from the product of Example 2 by vacuum distillation at 91° C. Then 154.8 grams 2-methyl-1,5-pentanediamine (Invista Dytek A) were added to the flask. A condenser was added to the flask to allow the contents to reflux. The mixture was heated to 181° C. and mixed at this temperature for 45 minutes under reflux while sparging gently with nitrogen. Vacuum and heat were applied to distill out excess Dytek A and water to form the amidoaminified reactants. After 1 hour at 181° C. and 6.7 KPa absolute pressure, the formed amidoamine of the carboxylated polyoxyethylene oxide and Dytek A had an amine nitrogen equivalent weight of 2639. The batch was then steam sparged with wet nitrogen at 164° C. to raise the amine nitrogen equivalent weight to 2865. After allowing the batch to cool to 110° C., deionized water was added to reduce the solids to 70%. To the batch was added 34 grams CARDURA E-10 (a glycidyl ester of a $C_{10}$ tertiary carboxylic acid) at 62° C. After allowing the batch to mix for 2 hours at 55-62° C., it was diluted to 64.8% solids and allowed to set overnight at room temperature.

The amine nitrogen equivalent weight of the aqueous capped amidoamine polymer was determined to be 3079. This prosurfactant was then used to make an epoxy dispersion as shown in Example 11, which epoxy dispersion was observed to have a low viscosity. This prosurfactant was also used with the prosurfactant from Example 6 to make the epoxy dispersion of Example 9, which epoxy dispersion exhibited a better shelf stability compared to the comparative "state of the art" Example 8.

EXAMPLE 6 is an example of the preparation of an amidoamine prosurfactant composition using Example 3 as the starting raw material.

To a resin flask equipped with agitation, a heating mantle, a nitrogen sparge and a vacuum system were added 1500.0 grams of aqueous, carboxylated polyoxyethylene oxide from the product of Example 3. The water was removed from the product of Example 3 by vacuum distillation at 91° C. Then 95.3 grams 2-methyl-1,5-pentanediamine (Invista Dytek A) were added to the flask. A condenser was added to the flask to allow the contents to reflux. The mixture was heated to 179° C. and mixed at this temperature for 45 minutes under reflux while sparging gently with nitrogen. Vacuum and heat were applied to distill out excess Dytek A and water to form the amidoaminified reactants. After 2.5 hours at 181° C. and 5.1 KPa absolute pressure, the formed amidoamine of the carboxylated polyoxyethylene oxide and Dytek A had an amine nitrogen equivalent weight of 2111. After 3 hours of continued vacuum distillation the amine nitrogen equivalent weight was 4531. The batch was then steam sparged with wet nitrogen at 155° C. to raise the amine nitrogen equivalent weight to 5013. After allowing the batch to cool to 110° C., deionized water was added to reduce the solids to 70%. Then 34 grams CARDURA E-10 (a glycidyl ester of a $C_{10}$ tertiary carboxylic acid) was added at 66° C. After allowing the batch to mix for 2 hours at 55-62° C., it was diluted to 64.2% solids and allowed to set overnight at room temperature.

The amine nitrogen equivalent weight of the aqueous capped amidoamine polymer was determined to be 5333. This prosurfactant was used to make an epoxy dispersion as shown in Example 12, which dispersion had a low pH and superior epoxy content stability. This prosurfactant was also blended with the prosurfactant from Example 5 to form the Example 9 epoxy dispersion which had improved shelf stability compared to that of the "state of the art" Example 8.

EXAMPLE 7 is an example of the preparation of the preferred invention amidoamine prosurfactant composition using a blend of the products of Example 2 and Example 3 as the starting raw materials.

To a stainless steel reactor equipped with a heating mantle, agitation, a nitrogen sparge and a vacuum system were added 2312.1 grams of aqueous, carboxylated polyoxyethylene oxide from the product of Example 2 and 1890.0 grams from the product of Example 3. The water was removed from this blend by vacuum distillation at up to 105° C. and 6.7 KPa absolute pressure. Then 418.1 grams 2-methyl-1,5-pentanediamine (Invista Dytek A) were added to the batch. A condenser was added to the flask to allow the contents to reflux. The mixture was heated to 184° C. and mixed at this temperature for 45 minutes under reflux while sparging gently with nitrogen. Vacuum and heat were applied to distill out excess Dytek A and water to form the amidoaminified reactants. After 4 hours at 171-188° C. and 13.5 to 5.1 KPa absolute pressure, the formed amidoamine of the carboxylated polyoxyethylene oxide and Dytek A had an amine nitrogen equivalent weight of 3811. After allowing the batch to cool to 110° C., deionized water was added to reduce the solids to 70%. Then 97.3 grams CARDURA E-10 (a glycidyl ester of a $C_{10}$ tertiary carboxylic acid) was added at 66° C. After allowing the batch to mix for 2 hours at 70-83° C., it was diluted to 64.3% solids.

The amine nitrogen equivalent weight of the capped amidoamine polymer was determined to be 3750. As expected from the molecular weight dispersity DP of the blend of the PEG 4000 and PEG 8000, this Example 7 coamidified blend of the oxidized respective PEG acids also has a molecular weight dispersity DP 1.2895 that is nearly the same as but slightly lower compared to that of the relevant blend of Examples 5 and 6 amidoaminified prosurfactants as shown in Table II. This coamidified prosurfactant was also used to make the preferred invention epoxy dispersion Example 9 which had lower viscosity, lower particle size and superior shelf stability that the state of the art examples.

EXAMPLE 8 is a comparative epoxy dispersion example involving the preparation of the epoxy dispersion made from a prosurfactant prepared according to the method described in Example 4.

To a resin flask equipped with a heating mantle, an agitator, a nitrogen purge, a vacuum system and a condenser were added 936.9 grams of EPON Resin 828 and 285.1 grams bisphenol A. The batch was heated with agitation to 115° C. Then 1.0 gram of triphenylphosphine was added to the mixture. The batch was heated with agitation to 132° C. and allowed to exotherm as high as 190° C. The batch was then held at 177° C.-190° C. for 45 minutes. The batch was then cooled to 132° C. and 99.3 grams of propylene glycol monomethyl ether were added. The batch was refluxed and cooled to 105° C. Then 84.1 grams of Example 4A prosurfactant having a high molecular weight content of 28.7%, 3164 equivalent weight nitrogen and 64.7% solids were added at atmospheric pressure. The batch was allowed to cool with agitation to 99° C. over 2.5 hours. At this point 285.5 grams of deionized water was quickly added to the batch over 5 minutes. The batch was then cooled with reduced pressure to 77° C. at which point the epoxy polymer and the prosurfactant epoxy formed a resin in water dispersion.

After mixing the dispersion for an additional 1.0 hrs at 44.0 KPa absolute pressure (to cool the batch to 55° C.) the mean Sa diameter (surface area) particle size was 0.723 microns and the mean Dv (volume) particle size was 1.105 microns. At this point the batch was returned to atmospheric pressure and 13.0 grams of acetone were added to the batch. The batch was mixed for 15 minutes at 55° C. and 1.26 grams of 50% polypropylene glycol solution of dodecylbenzene sulfonic acid was added to control the pH to near neutral. The batch was mixed an additional 15 minutes and then 26.0 grams of HELOXY Modifier 8 were added over 10 minutes. The batch was mixed for 20 minutes and then allowed to cool overnight. The next morning the batch was warmed with agitation over 1.0 hour to 52° C. The batch was diluted with deionized water over 2 hours while allowing the temperature to cool to 48° C.

The batch was mixed an additional 20 minutes and then filtered through an 80 mesh filter bag. Samples were further diluted to 55.9%, 54.2%, and 51.8% non-volatiles. The batch Brookfield RVDVI viscosities measured the same day they were diluted were 16,740 cP, 7,040 cP, and 2,600 cP respectively at measured with spindle 5 and 20 rpm at 25° C. The initial viscosities (after 1 day at 49° C./2 days at 25° C. to allow for deairing and pH equilibration) were 15,560 cP, 5,900 cP and 1,620 cP at the respective % solids. The particle size of this final epoxy dispersion was Sa 0.743 and Dv 0.942 microns. The epoxide equivalent weight of the resin content was 504. The pH of the batch after 1 day at 49° C. plus 1 day at 25° C. was 8.60. As shown in Table III, this epoxy dispersion made with the Example 4, standard prosurfactant, had a low particle size, a moderate initial viscosity and a relatively high pH. The high pH contributed to the relatively fast rates of viscosity and epoxy equivalent weight increases as shown in Table III. Thus the increase in viscosity and epoxy equivalent weight limits the stated shelf life to less than one year.

The structure for the state of the art surfactant of Example 8 is the following structure where n is 1.2.

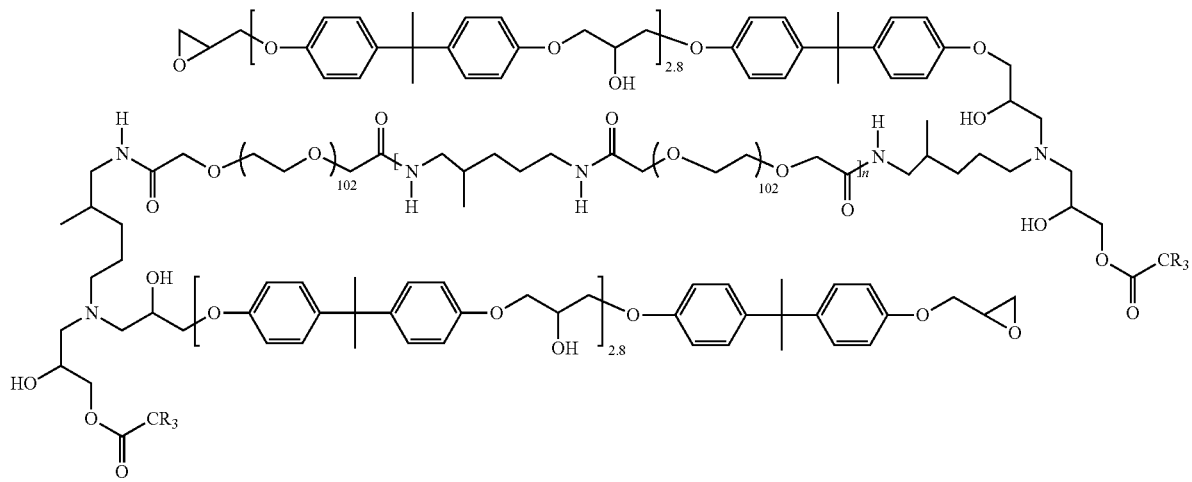

Example 9A is an example of the preparation of the epoxy dispersion made from a 55:45 Ratio Blend of prosurfactants Example 5 and Example 6 respectively.

To a resin flask equipped with a heating mantle, an agitator, a nitrogen purge, a vacuum system and a condenser were added 933.3 grams of EPON Resin 828 and 289.5 grams bisphenol A. The batch was heated with agitation to 105° C. Then 1.0 gram of triphenylphosphine was added to the mixture. The batch was heated with agitation to 132° C. and allowed to exotherm as high as 190° C. The batch was then held at 177° C.-190° C. for 45 minutes. The batch was then cooled to 136° C. and 99.3 grams of propylene glycol monomethyl ether were added. The batch was refluxed and cooled to 105° C. Then 47.0 grams of Example 5 and 38.4 grams of Example 6 (85.4 g total) were added at atmospheric pressure. The batch was allowed to cool with agitation to 99° C. over 2.0 hours. At this point 284.6 grams of deionized water was quickly added to the batch over 5 minutes. The batch was then cooled with reduced pressure to 77° C. at which point the epoxy polymer and the prosurfactant epoxy formed a resin in water dispersion.

After mixing the dispersion for an additional 2.5 hours at 44.0 KPa absolute pressure (to cool the batch to 55° C.) the mean Sa diameter (surface area) particle size was 0.875 microns and the mean Dv (volume) particle size was 1.345. At this point the batch was returned to atmospheric pressure and 13.0 grams of acetone were added to the batch. The batch was mixed for 5 minutes at 55° C. and 1.26 grams of 50% polypropylene glycol solution of dodecyl benzene sulfonic acid was added to control the pH to near neutral. The batch was mixed an additional 10 minutes and then 26.0 grams of HELOXY Modifier 8 were added over 10 minutes. The batch was mixed for 20 minutes and then allowed to cool overnight. The next morning the batch was warmed with agitation over 1.0 hour to 54° C. The batch was diluted with deionized water over 2 hours while allowing the temperature to cool to 50° C.

The batch was mixed an additional 20 minutes and then filtered through an 80 mesh filter bag. Samples were further diluted to 55.7%, 54.5%, and 52.1% non-volatiles. The fresh viscosities (as measured in Example 8) were 15,160 cP, 6,160 cP and 2,020 cP respectively at 25° C. The initial viscosities (after 1 day at 49° C./2 days at 25° C.) measured 15,960 cP, 5,100 cP and 1,480 cP. The particle size of this final epoxy dispersion was Sa 0.862 and Dv 1.428 microns. The epoxide equivalent weight of the resin content was 506. The pH of the batch after 1 day at 49° C. plus 2 days at 25° C. was 8.18. As shown in Table III, the pH of this dispersion and the resulting viscosity and epoxy equivalent weight rate of increase were better than the standard dispersion Example 8. This dispersion also had better shelf stability than both Examples 11 and 12 as shown in Table IV.

Example 9B is an example of the preparation of the epoxy dispersion made from an 85:15 ratio blend of prosurfactants Example 5 and Example 6 respectively. This epoxy dispersion was made by following the same procedure as in Example 9A except the weight ratio of active prosurfactants Example 5 and Example 6 was adjusted to 85:15 respectively.

Example 9C is an example of the preparation of the epoxy dispersion made from a 70.30 ratio blend of prosurfactants Example 5 and Example 6 respectively. This epoxy dispersion was made by following the same procedure as in Example 9A except the weight ratio of active prosurfactants Example 5 and Example 6 was adjusted to 70:30 respectively.

Example 10 is an example of the preparation of the epoxy dispersion made from the product of Example 7 prosurfactant according to the invention.

To a resin flask equipped with a heating mantle, an agitator, a nitrogen purge, a vacuum system and a condenser were added 936.8 grams of EPON Resin 828, 285.6 grams bisphenol A and 1.0 gram of triphenylphosphine. The flask was purged with nitrogen and the pressure was reduced to 20.3 KPa absolute pressure. The batch was heated with agitation to 130° C. and allowed to exotherm to 194° C. The batch was allowed to cool to 176° C. at atmospheric pressure over 1.5 hours. The batch was then cooled to 151° C. and 99.3 grams of propylene glycol monomethyl ether were added. The batch was reflux cooled with reduced pressure to 99° C. Then 84.6 grams of Example 7 were added at atmospheric pressure. The batch was allowed to cool with agitation to 96° C. over 1.8 hours. At this point 285.1 grams of deionized water was added to the batch over 2 minutes. The batch was then cooled with reduced pressure to 75° C. at which point the epoxy polymer and the epoxy prosurfactant epoxy formed a resin in water dispersion.

After mixing this dispersion for an additional 1.5 hrs at 37.3 KPa absolute pressure (to cool the batch to 57° C.) the mean Sa (surface area) diameter particle size was 0.869 microns and the mean Dv (volume) diameter particle size was 1.274 microns. At this point the batch was returned to atmospheric pressure and 13.0 grams of acetone were added to the batch. The batch was mixed for 20 minutes at 57° C. and 1.26 grams of a 50% polypropylene glycol solution of dodecylbenzene sulfonic acid was added to control the pH to near neutral. The batch was mixed for an additional 20 minutes and then 26.0 grams of HELOXY Modifier 8 were added over 10 minutes. The batch was mixed for 1 hour and then allowed to cool to 22° C. overnight. The next morning the batch was warmed with agitation over 1.25 hours to 53° C.

Then the batch was diluted to 52.2% solids over 2 hours while allowing the temperature to cool to 32° C. The batch was mixed for an additional 20 minutes and then filtered through an 80 mesh filter bag. The particle size of this final epoxy dispersion was Sa 0.680 and Dv 1.013 microns. The fresh batch viscosity was 1,200 cP at 25° C. The epoxide equivalent weight of the resin content was 513. The pH of the batch after 1 day at 49° C. plus 3 day at 25° C. was 7.47 and the viscosity was 1,060 cP at 25° C. measured as described in Example 8. As shown in Table IV, this dispersion had the lowest initial viscosity profile compared to the "state of the art" Example 8 as well as all other examples. This dispersion also was the lowest in particle size and had a lower pH with excellent epoxy equivalent weight stability (see Table III.).

The surfactant of Example 10 is believed to have the following structure:

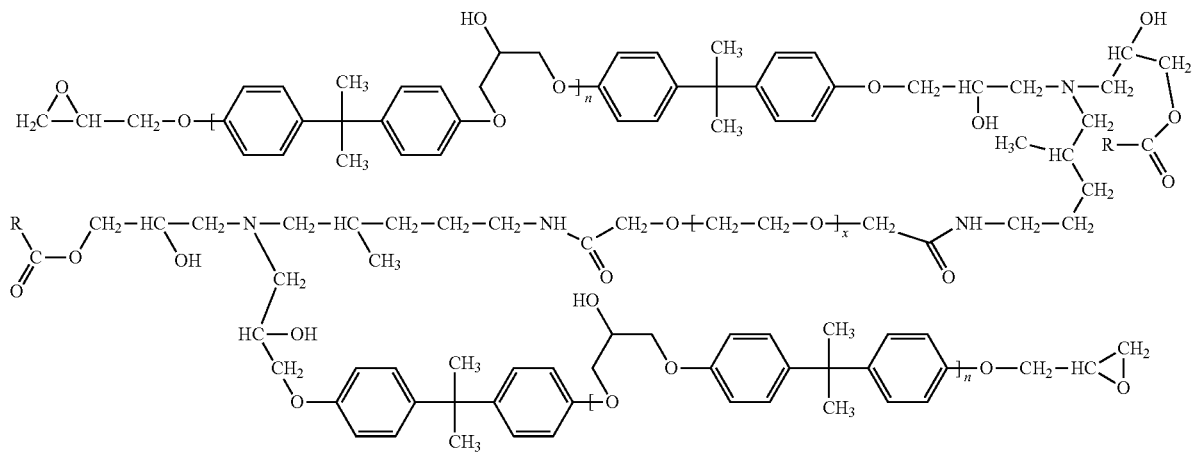

R = C9 branched alkyl chain
n = 0, 1, 2
x = 104 avg where R is a C9 branched alkyl chain, n is 0, 1, or 2, and x=131 average obtained by 55 parts X=81+45 parts X=192.

Example 11 is a comparative example of the preparation of the epoxy dispersion made from a prosurfactant prepared according to the method described in Example 5.

To a resin flask equipped with a heating mantle, an agitator, a nitrogen purge, a vacuum system and a condenser were added 933.7 grams of EPON Resin 828 and 288.2 grams bisphenol A. The batch was heated with agitation to 110° C. Then 1.0 gram of triphenylphosphine was added to the mixture. The batch was heated with agitation to 132° C. and allowed to exotherm as high as 190° C. The batch was then held at 177° C.-190° C. for 45 minutes. The batch was then cooled to 133° C. and 99.3 grams of propylene glycol monomethyl ether were added. The batch was refluxed and cooled to 105° C. Then 84.0 grams of batch made by Example 5 process but having a high molecular weight peak content of 30.8%, 2863 equivalent weight titrateable nitrogen and 64.8% solids were added at atmospheric pressure. The batch was allowed to cool with agitation to 98° C. over 2.25 hours. At this point 285.5 grams of deionized water was quickly added to the batch over 10 minutes. The batch was then cooled with reduced pressure to 74° C. at which point the epoxy polymer and the prosurfactant epoxy formed a resin in water dispersion.

After mixing the dispersion for an additional 2.0 hrs at 44.0 KPa absolute pressure (to cool the batch to 55° C.) the mean Sa (surface area) diameter particle size was 0.875 microns and the mean volume (Dv) particle size was 1.324 microns. At this point the batch was returned to atmospheric pressure and 13.0 grams of acetone were added to the batch. The batch was mixed for 20 minutes at 54° C. and 1.3 grams of 50% polypropylene glycol solution of dodecylbenzene sulfonic acid was added to control the pH. The batch was mixed an additional 20 minutes and then 26.0 grams of HELOXY Modifier 8 were added over 10 minutes. The batch was mixed for 35 minutes at 54° C. and then allowed to cool without mixing to 22° C. overnight. The next morning the batch was very slowly heated up to 53° C. over an hour. The batch was then diluted with deionized water over 1.5 hours while allowing the temperature to cool to 50° C.

The batch was mixed an additional 20 minutes and then filtered through an 80 mesh filter bag. Samples were further diluted to 55.9%, 53.8%, and 52.0% non-volatiles. The batch Brookfield RVDVI viscosities measured the same day they were diluted were 27,600 cP, 9,560 cP, and 1,700 cP respectively measured with spindle 5 (or 6 for over 20,000 cP) and 20 rpm at 25° C. The initial viscosities (after 1 day at 49° C. plus 2 days at 25° C. to allow for deairing and pH equilibration) were 22,200 cP, 5,980 cP and 920 cP at the respective % solids. The particle size of this final epoxy dispersion was Sa 0.835 and Dv 1.301 microns. The epoxide equivalent weight of the resin content was 518. The pH of the batch after 1 day at 49° C. plus 1 day at 25° C. was 8.79. This dispersion had a low initial viscosity, but both the viscosity and epoxy equivalent weight were not stable and the pH was high. The viscosity of this dispersion increased more rapidly during storage at 25° C. compared to Example 8 as shown in Table IV.

Example 12 is a comparable example of the preparation of the epoxy dispersion made from a prosurfactant prepared according to the method described in Example 6.

To a resin flask equipped with a heating mantle, an agitator, a nitrogen purge, a vacuum system and a condenser were added 933.5 grams of EPON Resin 828 and 288.9 grams bisphenol A. The batch was heated with agitation to 104° C. Then 1.0 gram of triphenylphosphine was added to the mixture. The batch was heated with agitation to 132° C. and allowed to exotherm as high as 190° C. The batch was then held at 177° C.-190° C. for 55 minutes. The batch was then cooled to 141° C. and 99.3 grams of propylene glycol monomethyl ether were added. The batch was refluxed and cooled to 109° C. Then 84.7 grams of batch made by Example 6 process but having a high molecular weight peak content of 27.14%, 2863 equivalent weight titrateable nitrogen and 64.2% solids were added at atmospheric pressure. The batch was allowed to cool with agitation to 98° C. over 2.0 hours. At this point 285.0 grams of deionized water was quickly added to the batch over 10 minutes. The batch was then cooled with reduced pressure to 74° C. at which point the epoxy polymer and the prosurfactant epoxy formed a resin in water dispersion.

After mixing the dispersion for an additional 1.0 hrs at 33.8 KPa absolute pressure (to cool the batch to 54° C.) the mean Sa diameter (surface area) particle size was 0.836 microns and the mean Dv (volume) particle size was 1.329 microns. At this point the batch was returned to atmospheric pressure and 13.0 grams of acetone were added to the batch. The batch was mixed for 20 minutes at 54° C. and 1.3 grams of 50% polypropylene glycol solution of dodecylbenzene sulfonic acid was added to control the pH to near neutral. The batch was mixed an additional 20 minutes and then 26.0 grams of HELOXY Modifier 8 were added over 10 minutes. The batch was mixed for 1 hour. The batch was diluted with deionized water over 1.5 hours while allowing the temperature to cool to 50° C.

The batch was mixed an additional 20 minutes and then filtered through an 80 mesh filter bag. Samples were further diluted to 55.8%, 53.9%, and 52.0% non-volatiles. The batch Brookfield RVDVI viscosities measured the same day they were diluted were 8,060 cP, 3,660 cP, and 1,680 cP respectively at measured with spindle 5 and 20 rpm at 25° C. The initial viscosities (after 1 day at 49° C./2 days at 25° C. to allow for deairing and pH equilibration) were 15,920 cP, 3,360 cP and 1,460 cP at the respective % solids. The particle size of this final epoxy dispersion was Sa 0.873 and Dv 1.288 microns. The epoxide equivalent weight of the resin content was 513. The pH of the batch after 1 day at 49° C. plus 1 day at 25° C. was 7.29. Although the pH and epoxy equivalent weight stability of this dispersion was preferred, the particle size was large and the initial viscosity was higher than the preferred Example 10 as shown in Tables III and IV).

Example 13 is an example of a co-oxidation of the preferred polyoxyethylene glycol (PEG) blend of 4000 and 8000 number average molecular weights in a ratio of 55 to 45 respectively, to a carboxylic acid functional surfactant.

The preferred polyoxyethylene glycol (PEG) blend of 4000 and 8000 number average molecular weights in a ratio of 55 to 45 (20.0 pounds of PEG 4000 diol and 16.36 pounds of PEG 8000 diol) respectively were oxidized together in the same manner as Example 3 (also according to the process outlined in U.S. Pat. No. 6,956,086 B2 Example 1) as an aqueous solution to the corresponding dicarboxylic acids. This process was repeated and the two products were blended. The resulting PEG acids were adjusted to 59.4% concentration in water and the average weight per acid of the PEG carboxylates were measured to be 3629.

Example 14 is an example of the preparation of amido amine prosurfactant composition using Example 13 as the starting raw material. The reactor contents of Example 13 were converted to the amidoamine prosurfactant by the same process as in Example 5. The resulting prosurfactant had an amine nitrogen equivalent weight of 4065 and a nonvolatile content of 63.0%.

Example 15 is an example of the preparation of an epoxy dispersion by the method described in Example 8 using Example 14 prosurfactant.

The resulting epoxy dispersion from prosurfactant from Example 14 had a typical average micron diameter particle size profile of Dv 0.870, Sa 0.623, Dn 0.633 and Dw 0.814. The epoxy equivalent weight of the dispersed polymer was 507, the viscosity was 1,220 cP at 52.2% NV. This epoxy dispersion was used with the amine curing agent dispersion in Example 16 to make a high performance primer paint as described in Example 17.

Example 16 is an example of the preparation of an amine curing agent dispersion using prosurfactant from Example 14.

In a similar fashion to the procedure described in U.S. Pat. No. 6,277,928 example 1, the prosurfactant of Example 14 was reacted into an excess solution of EPON 1001X75 in a ratio of 5.5 to 94.5. This epoxy prosurfactant adduct was subsequently reacted into 3 moles triethylenetetramine (TETA) per equivalent of epoxy. After the reaction was completed the volatiles including 2 moles excess TETA were removed by vacuum distillation. Then one mole of monoepoxy Heloxy 62 was added per equivalent of unreacted primary amine. This amine functional adducted polymer was then dispersed in water to give a white dispersion with an average micron particle size diameter of Dv 0.516 and Sa 0.423. The non-volatile content of this dispersion was 51.6% and the non-volatile polymer amine value was 257. This amine functional polymer dispersion was used in combination with the Example 15 epoxy dispersion to make the high performance primer paint described in Example 18.

The Momentive SF 1700 paint performance of the example 15 Epoxy and Example 16 Amine Dispersions included a Hours Thru Dry of 1.25 hours, a 7 Day Pencil SF1700 of H, and a SF1700 KU Viscosity at Initial and 3 hour reviews of 71 and 68 respectively. In contrast, the Commercial Standard Epoxy and Amine Dispersions derived from Example 4 prosurfactant included a Hours Thru Dry SF1700 of 1.75 hours, a 7 Day Pencil SF1700 of H, and a SF1700 KU Viscosity at Initial and 3 hours of 54 and 78 respectively.

Example 17 is an example of the preparation of an amine curing agent dispersion using prosurfactant from Example 7.

In a similar fashion to the procedure described in U.S. Pat. No. 6,277,928 example 1, the prosurfactant of Example 7 was reacted into an excess solution of EPON 1001×75 in a ratio of 5.5 to 94.5. This epoxy prosurfactant adduct was subsequently reacted into 3 moles triethylenetetramine (TETA) per equivalent of epoxy. After the reaction was completed the volatiles including 2 moles excess TETA were removed by vacuum distillation. Then one mole of monoepoxy Heloxy 62 was added per equivalent of primary amine. This amine functional adducted polymer was then dispersed in water to give a white dispersion with an average micron particle size diameter of Dv 0.331 and Sa 0.219. The non volatile content of this dispersion was 51.2% and the non volatile amine polymer amine value was 242. This amine functional polymer dispersion was used in combination with Example 15 epoxy dispersion to make the high performance primer coated described in Example 18.

The Momentive SF 1700 paint performance of the example 15 Epoxy and Example 17 Amine Dispersions included a Hours Thru Dry of 1.5 hours, a 7 Day Pencil SF1700 of F+, and a SF1700 KU Viscosity at Initial and 3 hour reviews of 68 and 73 respectively. In contrast, the Commercial Standard Epoxy and Amine Dispersions derived from Example 4 prosurfactant included a Hours Thru Dry SF1700 of 1.75 hours, a 7 Day Pencil SF1700 of F+, and a SF1700 KU Viscosity at Initial and 3 hour of 54 and 78 respectively.

Example 18 is an example of the preparation of Primer paints from dispersions made with above amidoamine prosurfactants as defined by Momentive published Starting Point Formulation 1700 as follows.

300.0 lbs (33.33 gallons) of the epoxy resin dispersion described herein in Example 15 was mixed with 26.0 lbs (2.95 gallons) of the PPH propylene glycol phenyl ether (from Dow Chemical), 3.0 lbs (0.35 gallons) of the EFKA® 2526 Defoamer (from CIBA Specialty Company) 100.0 lbs (3.1 gallons) of the Ti-Pure® R-960 pigment (from Du Pont), 100.0 lbs (4.12 gallons) of the 10 ES WOLLASTOCOAT® (from NYCO Minerals, Inc.) 67.0 lbs (1.83 gallons) of the Sparmite™ A barytes (from Elementis Pigments Inc.), 94.7 lbs (3.98 gallons) of the HALOX® SW-111 (from HALOX Pigments), 7.0 lbs (0.3 gallons) of the wet ground mica, 325 Mesh (from Franklin Industrial Minerals). The mixture was subjected to a high speed disperse process to provide a texture of 5-6 Hegman Scale. The mixing speed was reduced and 107.5 lbs (11.94 gallons) of the EPI-REZ Resin 6520-WH-53 (from Momentive Specialty Chemicals), 8.6 lbs (0.98 gallons) of the CoatOSil™ 1770 Silane (from Momentive Performance Products), and 142.9 (7.12 gallons) of water was then added. The mixture at this point comprises 959.7 lbs (80.0 gallons) of composition. To this mixture was added 180 lbs (19.78 gallons) of the curing agent dispersion of Example 17 as described herein (from Momentive Specialty Chemicals) and 2 lbs (0.22 gallons) of the Raybo 60 flash rust inhibitor (from Raybo). The composition was formulated at 1:1 stoichiometry (epoxy:amine equivalents).

Example 19 is an example of the preparation of epoxy dispersion for fiber sizing using prosurfactant Example 7.

The prosurfactant from Example 7 may also be used to make waterborne epoxy dispersions for fiber sizing or adhesives that contain reduced or no organic volatile solvents. To a 3 liter resin pot was added 99.7 grams liquid epoxy resin, EPON 828, 102.5 grams of aqueous Example 7 prosurfactant and 200.0 grams of deionized water. An agitator and a chilled water condenser were added to the flask to contain the water vapor during heating the batch with mixing to 180° F.

The batch was allowed to react for 1 hour at this temperature and then 1.6 grams of dodecylbenzene sulfonic acid was added. The batch was then diluted further with 200.0 grams water, allowed to cool to 160° F. and then 1,141.8 grams of additional EPON 828 was added over 30 minutes with good mixing. The batch was allowed to cool to 125° F. with mixing over 2 hours, and then 140.0 grams of water was added followed by 0.7 grams Rhodaline 640 defoamer. The batch was mixed for 1.5 hours at 125-132° F. and then diluted to 54.2% NV with an additional 340.3 grams of water with 11.0 grams of OptifloH600VF added. After allowing the batch to cool slowly to 25° C., without mixing for 16 hours, the viscosity was 1,240 cP measured by Brookfield spindle 5 at 20 rpm. The particle size was Dv 0.71, the epoxy equivalent weight of the dispersed polymer was 197.2 and the pH was 6.9.

Example 20 is the preparation of an amidoamine prosurfactant composition using Example 13 and isodecyloxypropyl-1,3-diaminopropane as the starting raw material.

To a 3-liter, 4-neck resin flask equipped with agitation, a heating mantle, a nitrogen sparge and a vacuum system were added 2195.1 grams of aqueous, carboxylated polyoxyethylene oxide from Example 13. The water was removed from the product of Example 13 by vacuum distillation at 91° C. Then 118.2 grams isodecyloxypropyl-1,3-diaminopropane were added to the flask. The flask was purged with nitrogen and heated to 215° C. at the maximum heating rate set by the temperature controller. Water distilled from the reaction mixtures as the amide formation reaction proceeded. The reaction mixtures were held for 3 hours at 165° C. under nitrogen with a xylene azeotrope and trap to collect water of amidification. The xylene and residual water were removed under reduced pressure with a strong nitrogen sparge. The amidoamine product was then cooled to approximately 90° C. and diluted with water 65.0% solids. The amine nitrogen equivalent weight of the aqueous capped amidoamine polymer (solids basis) was determined to be 3610. This prosurfactant was used to make epoxy dispersion Example 21 which was low viscosity.

Example 21 is an example of the preparation of an Epoxy dispersion by the method described in Example 10 using Example 20 prosurfactant.

The dispersion was made by the same procedure as Example 10 but using prosurfactant Example 20. The resulting epoxy dispersion using the Example 20 prosurfactant had a typical average micron diameter particle size profile of Dv 1.39, Dn 0.84 and Dw 1.14. The epoxy equivalent weight of the dispersed polymer was 529, the viscosity was 360 cps at 53.75% NV and the dispersion pH was 8.38 after 24 hours at 25° C.

TABLE III

| Dispersion # | 1 | 2 | 3 | 4 | 5 | 6 |
|---|---|---|---|---|---|---|
| Prosurfactant Example | 4 | 5 | 6 | 5/6 | 7 | 14 |
| Epoxy Dispersion Example | 8 | 11 | 12 | 9 A | 10 | 15 |
| Surfactant PEG | 4600 | 4000 | 8000 | 4000/8000 55/45 Blend | 4000/8000 55/45 co-amido-aminified | 4000/8000 55/45 co-oxidized |
| % surfactant | 3.40 | 3.40 | 3.40 | 3.40 | 3.40 | 3.40 |
| Initial Viscosity | 2,600 | 1700 | 1680 | 2020 | 1200 | 1,220 |
| Particle Dv size μm/SA, | 0.942/ 0.743 | 1.301/ 0.835 | 1.288/ 0.873 | 1.248/ 0.862 | 1.013/ 0.680 | 0.87/ 0.623 |
| pH (Initial) | 8.60 | 8.79 | 7.29 | 8.18 | 7.47 | 6.74 |
| pH final* | 9.23 | 9.15 | 9.04 | 9.04 | 9.03 | 9.26 |
| Shelf life months* | >15 | 9 | >15 | >15 | >15 | >10 |

The pH final was the measurement of the pH at time at room temperature to double (or exceed 6,000 cP) viscosity.

Table IV below provides for a comparison of viscosity stability with longer shelf life at 25° C. As shown below, the epoxy dispersion made from the blends (Examples 9 and 10) provided equivalent or improved viscosity results as compared to the prior art epoxy dispersions (Examples 8, 11, and 12). The following viscosity measurements are in centipoise (cP or cps).

TABLE IV

| Months | Ex. #11: 4000 MW | Ex. #8: 4600 MW | Ex. #12: 8000 MW | Ex. #9A: 55/45 Blend of 4000 Mw/8000 Mw | Ex. #10: 55/45 Co-Amid. Blend of 4000 Mw/8000 Mw |
|---|---|---|---|---|---|
| 0 | 1,700 | 2,600 | 1,680 | 2,020 | 1,200 |
| 8 | 4,720 | 4,200 | 2,400 | 3,340 | 1,620 |
| 10 | 6,840 | 4,220 | 2,440 | 4,140 | 1,760 |
| 15 | 19,620 | 4,360 | 2,820 | 4,280 | 1,820 |
| % − Δ | 46 | 48 | 13 | 27 | 26 |
| % + Δ | 1,054 | 68 | 68 | 112 | 52 |
| Δ Sum* | 1,100 | 116 | 81 | 139 | 78 |
| μm Particle size Sa/Dv | 0.835/1.301 | 0.743/0.942 | 0.873/1.288 | 0.862/1.428 | 0.680/1.013 |

*Brookfield Viscosity spindle 5 at 20 rpm at 25° C.

Table V below provides for a comparison of epoxy equivalent weight stability at 25° C. over 15 months between compositions as described herein and prior art compositions as detailed. Invention most preferred example 10 and preferred example 9 have significantly improved epoxy equivalent weight stability over state of the art control Examples 8 and 11.

TABLE V

| Months at 25° C. | Control Ex. 8 | Blend Ex. 9A | Co-amid Ex. 10 | PEG 4000 Ex. 11 | PEG 8000 Ex. 12 |
|---|---|---|---|---|---|
| 0 | 504 | 516 | 513 | 518 | 513 |
| 15 | 581 | 575 | 560 | 592 | 562 |
| % Δ | 15 | 11 | 9 | 14 | 10 |

Table VI below and the graph as shown in FIG. 1, provide for a comparison of particle size stability between compositions as described herein and prior art composition as detailed. Table VI illustrates the particle size stability of examples 9 and 10 as described herein over the state of the art control as shown in Example 8. FIG. 1, illustrates a graph comparing epoxy dispersion particle size stability at 25° C. for epoxy dispersions as formed herein in Examples 9A, 9B, and 9C as compared to the prior art Examples 11 and 12.

TABLE VI

| Dv Change | control Ex 8 | blend Ex 9 | Co-amide Ex 10 |
|---|---|---|---|
| Δ | 0.613 | 0.420 | 0.312 |
| Initial Dv | 0.942 | 1.248 | 1.073 |
| Dv @ 10 months | 1.555 | 1.668 | 1.385 |

While the present invention has been described and illustrated by reference to particular embodiments, those of ordinary skill in the art will appreciate that the invention lends itself to variations not necessarily illustrated herein.

What is claimed is:

1. An amidoamine composition, comprising a reactant product of:
   an acid terminated polyoxyalkylene composition of two or more acid terminated polyoxyalkylene polyol compounds, wherein the acid terminated polyoxyalkylene composition having a polydispersity of 1.1 or greater and the two or more acid terminated polyoxyalkylene polyol compounds have from about 50% to about 100% of carboxylic end groups oxidized from hydroxyl end groups; and
   a diamine compound comprising a first amine substituent group of a primary amine substituent group and a second amine substituent group of a primary amine substituent group or a secondary amine substituent group, wherein the reaction product comprises an amidoamine compound having the formula of:

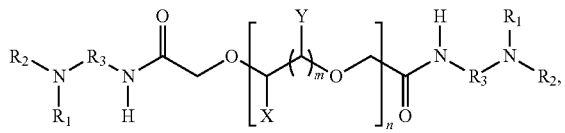

wherein each of $R_1$ and $R_2$ comprises a hydrogen atom or a substituent group selected from the group consisting of a branched or linear aliphatic, a cycloaliphatic, an aromatic substituent group and combinations thereof, having 1 to 21 carbon atoms, with at least one of $R_1$ and $R_2$ comprising a hydrogen atom, $R_3$ is a divalent hydrocarbon substituent group selected from the group consisting of a branched or linear aliphatic, a cycloaliphatic, an aromatic substituent group, and combinations thereof, having 2 to 18 carbon atoms, n is an average number from about 18 to about 500, X is a hydrogen atom or a substituent group selected from the group consisting of a methyl substituent, an ethyl substituent, a hydroxymethyl substituent group, and combinations thereof, and Y is a hydrogen atom or a substituent group selected from the group consisting of a methyl substituent, an ethyl substituent, a hydroxymethyl substituent group, and combinations thereof.

2. The composition of claim 1, wherein the amidoamine compound comprises an amine value from about 8 to about 30.

3. The composition of claim 1, wherein the diamine compound comprises two primary amine substituent groups with the diamine having the formula:

$$H_2N-R_3-NH_2,$$

wherein $R_3$ is a divalent hydrocarbon substituent group selected from the group consisting of a branched or linear aliphatic, a cycloaliphatic, an aromatic substituent group, and combinations thereof, having 2 to 18 carbon atoms.

4. The composition of claim 3, wherein the diamine compound is provided at a stoichiometric excess of amine substituent groups to carboxylic end groups of the acid terminated polyoxyalkylene composition.

5. The composition of claim 3, wherein the reactant product further comprises a monoepoxy compound.

6. The composition of claim 1, wherein the diamine compound comprises a primary amine substituent group and a secondary amine substituent group with the diamine having the formula:

$$R_1-HN-R_3-NH_2,$$

wherein $R_1$ is a branched or linear aliphatic, a cycloaliphatic, or an aromatic divalent substituent group having 1 to 21 carbon atoms and $R_3$ is a divalent hydrocarbon substituent group selected from the group consisting of a branched or linear aliphatic, a cycloaliphatic, an aromatic substituent group, and combinations thereof, having 2 to 18 carbon atoms.

7. The composition of claim 6, wherein the $R_1$ substituent group further comprises an end group selected from the group consisting of a methyl group, a hydroxyl group, and combinations thereof, and the $R_3$ substituent group further comprises an end group selected from the group consisting of a methyl group, a hydroxyl group, and combinations thereof.

8. The composition of claim 7, wherein the $R_1$ substituent group, the $R_3$ substituent group, or both, further comprises one or more non-reactive oxygen or nitrogen atoms in the backbone of the substituent group.

9. The composition of claim 1, wherein each of the two or more polyoxyalkylene polyol compounds are reacted with the diamine compound separately and then combined to form the amidoamine composition.

10. A method for forming an amidoamine composition, comprising:
providing an acid terminated polyoxyalkylene composition of two or more acid terminated polyoxyalkylene polyol compounds, wherein the acid terminated polyoxyalkylene composition having a polydispersity of 1.1 or greater and the two or more acid terminated polyoxyalkylene polyol compounds have from about 50% to about 100% of carboxylic end groups oxidized from hydroxyl end groups;
providing a diamine compound comprising a first amine substituent group of a primary amine substituent group and a second amine substituent group of a primary amine substituent group or a secondary amine substituent group; and
reacting the acid terminated polyoxyalkylene composition and the first diamine compound to form a reactant product, wherein the reaction product comprises an amidoamine compound having the formula of:

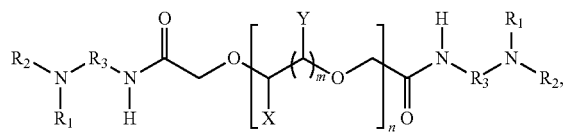

wherein each of $R_1$ and $R_2$ comprises a hydrogen atom or a substituent group selected from the group consisting of a branched or linear aliphatic, a cycloaliphatic, an aromatic substituent group and combinations thereof, having 1 to 21 carbon atoms, with at least one of $R_1$ and $R_2$ comprising a hydrogen atom, $R_3$ is a divalent hydrocarbon substituent group selected from the group consisting of a branched or linear aliphatic, a cycloaliphatic, an aromatic substituent group, and combinations thereof, having 2 to 18 carbon atoms, n is an average number from about 18 to about 500, X is a hydrogen atom or a substituent group selected from the group consisting of a methyl substituent, an ethyl substituent, a hydroxymethyl substituent group, and combinations thereof, and Y is a hydrogen atom or a substituent group selected from the group consisting of a methyl substituent, an ethyl substituent, a hydroxymethyl substituent group, and combinations thereof.

11. The method of claim 10, wherein the amidoamine compound comprises an amine value from about 8 to about 30.

12. The method of claim 10, wherein the providing the diamine compound comprises providing a diamine compound having two primary amine substituent groups with the formula:

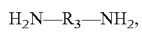

wherein $R_3$ is a divalent hydrocarbon substituent group selected from the group consisting of a branched or linear aliphatic, a cycloaliphatic, an aromatic substituent group, and combinations thereof, having 2 to 18 carbon atoms.

13. The method of claim 12, wherein the providing the diamine compound comprises providing the diamine compound at a stoichiometric excess of amine substituent groups to carboxylic end groups of the acid terminated polyoxyalkylene composition.

14. The method of claim 12, further comprising reacting the reaction product with a monoepoxy-containing composition.

15. The method of claim 10, wherein the providing the diamine compound comprises providing a diamine compound having a primary amine substituent group and a secondary amine substituent group with the diamine having the formula:

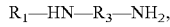

wherein $R_1$ is a branched or linear aliphatic, a cycloaliphatic, or an aromatic substituent group having 1 to 21 carbon atoms and $R_3$ is a divalent hydrocarbon substituent group selected from the group consisting of a branched or linear aliphatic, a cycloaliphatic, an aromatic substituent group, and combinations thereof, having 2 to 18 carbon atoms.

16. The method of claim 15, wherein the $R_1$ substituent group further comprises an end group selected from the group consisting of a methyl group, a hydroxyl group, and combinations thereof, and the $R_3$ substituent group further comprises an end group selected from the group consisting of a methyl group, a hydroxyl group, and combinations thereof.

17. The method of claim 16, wherein the $R_1$ substituent group, the $R_3$ substituent group, or both, further comprises one or more non-reactive oxygen or nitrogen atoms in the backbone of the substituent group.

18. The method of claim 10, wherein each of the two or more polyoxyalkylene polyol compounds are reacted with the diamine compound separately to form a first and second amidoamine compound, and further comprising intermixing the first and second amidoamine compounds.

19. The method of claim 10, further comprising reacting the reactant product with an epoxy composition to form an epoxy functional amidoamine composition.

20. The method of claim 19, wherein the epoxy composition comprises a di-epoxy component.

21. The method of claim 20, wherein the di-epoxy component comprises a di-epoxy resin or a mixture of a di-epoxy resin and a phenolic compound.

22. The method of claim 19, wherein the epoxy composition comprises at least one epoxy resin having a functionality of greater than 0.8 epoxide groups per molecule.

23. The method of claim 19, wherein the epoxy composition comprises a stoichiometric excess of epoxy substituent groups to amine groups and water, and the epoxy functional amidoamine composition comprises an aqueous epoxy resin dispersion.

24. The method of claim 23, wherein the epoxy-functional surfactant comprises from about 1 wt. % to about 20 wt. % of the dispersion.

25. The method of claim 19, wherein the epoxy functional amidoamine composition comprises an epoxy-functional surfactant having the formula:

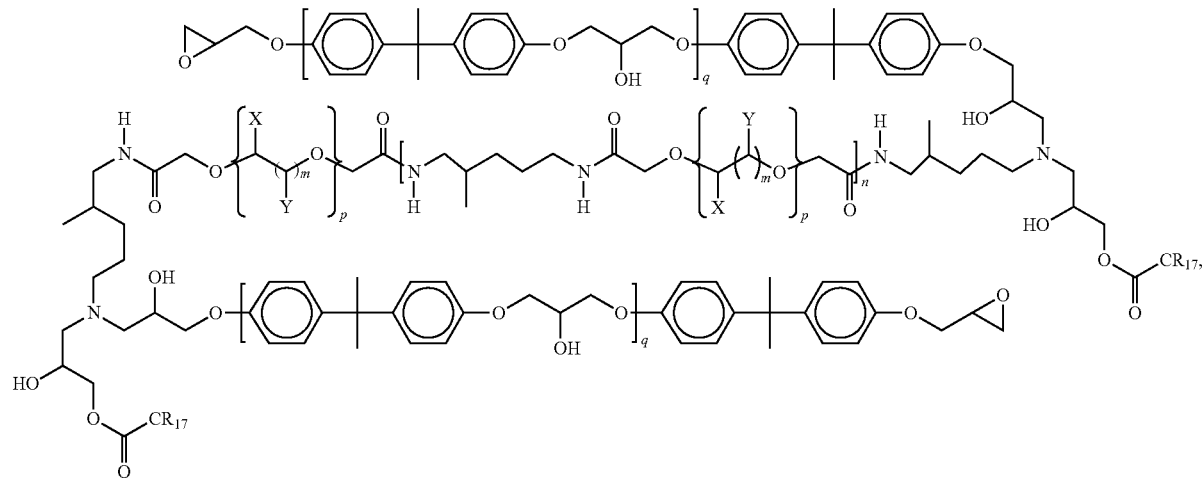

wherein m is from 1 to 11, n is from 1 to 3, q is from 0 to 8, each p is from about 18 to about 500, X is a hydrogen atom, a methyl substituent, an ethyl substituent, a hydroxymethyl substituent group, subsets thereof, or combinations thereof, each Y is a hydrogen atom, a methyl substituent, an ethyl substituent, a hydroxymethyl substituent group, or combinations thereof, and $R_{17}$ is an alkyl group, an aryl group, an acyl group, or combinations thereof.

26. The method of claim 19, further comprising reacting the epoxy functional amidoamine composition with a polyamine compound.

* * * * *